(12) United States Patent
Mahy et al.

(10) Patent No.: US 9,674,399 B2
(45) Date of Patent: Jun. 6, 2017

(54) SYSTEM AND METHOD FOR REGULARIZING AN INK MODEL FOR A COLOR DEVICE

(71) Applicant: AGFA GRAPHICS NV, Mortsel (BE)

(72) Inventors: Marc Mahy, Mortsel (BE); Koen Vande Velde, Mortsel (BE); Dmitry Tunitsky, Mortsel (BE)

(73) Assignee: AGFA GRAPHICS NV, Mortsel (BE)

(*) Notice: Subject to any disclaimer, the term of this patent is extended or adjusted under 35 U.S.C. 154(b) by 66 days.

(21) Appl. No.: 14/378,693

(22) PCT Filed: Feb. 21, 2013

(86) PCT No.: PCT/EP2013/053480
§ 371 (c)(1),
(2) Date: Aug. 14, 2014

(87) PCT Pub. No.: WO2013/124369
PCT Pub. Date: Aug. 29, 2013

(65) Prior Publication Data
US 2016/0112603 A1   Apr. 21, 2016

Related U.S. Application Data

(60) Provisional application No. 61/603,975, filed on Feb. 28, 2012.

(30) Foreign Application Priority Data

Feb. 22, 2012   (EP) .................................... 12156431

(51) Int. Cl.
*H04N 1/52*   (2006.01)
*H04N 1/60*   (2006.01)
*G06K 15/02*  (2006.01)

(52) U.S. Cl.
CPC .......... *H04N 1/52* (2013.01); *G06K 15/1878* (2013.01); *H04N 1/6022* (2013.01);
(Continued)

(58) Field of Classification Search
None
See application file for complete search history.

(56) References Cited

U.S. PATENT DOCUMENTS 5,878,195 A     3/1999  Mahy
2011/0038010 A1* 2/2011  Chen ................ H04N 1/6033
                                                358/3.23
(Continued)

FOREIGN PATENT DOCUMENTS

EP    1 083 739 A2   3/2001
EP    1 146 726 A1  10/2001

OTHER PUBLICATIONS

Official Communication issued in International Patent Application No. PCT/EP2013/053480, mailed on May 24, 2013.
(Continued)

*Primary Examiner* — Christopher D Wait
(74) *Attorney, Agent, or Firm* — Keating and Bennett, LLP

(57) ABSTRACT

A method including the steps of selecting an n-ink model for a color device, for transferring a set of colorant values in colorant space to a set of color values in color space; selecting a printer characteristic of the n-ink model, wherein the printer characteristic indicates the regularity of the n-ink model; evaluating, for the n-ink model, a set of one or more values and/or ranges for the printer characteristic, thus determining the regularity of the n-ink model; and modifying the n-ink model such that the modified n-ink model is regular, if, based on the evaluation, the n-ink model was not regular.

8 Claims, 19 Drawing Sheets

(52) U.S. Cl.
CPC ......... *H04N 1/6025* (2013.01); *H04N 1/6033* (2013.01); *H04N 2201/0082* (2013.01); *H04N 2201/0089* (2013.01)

(56) References Cited

U.S. PATENT DOCUMENTS

2011/0267629 A1* 11/2011 Fan ...................... H04N 1/6025
358/1.9
2011/0286015 A1* 11/2011 Maltz .................. H04N 1/6019
358/1.9

OTHER PUBLICATIONS

Bala, "Inverse Problems in Color Device Characterization," Proceedings of SPIE, vol. 5016, Jan. 23, 2003, pp. 185-195.
Balasubramanian, "Optimization of the Spectral Neugebauer Model for Printer Characterization," Journal of Electronic Imaging, vol. 8, No. 2, Apr. 1, 1999, pp. 156-166.

* cited by examiner

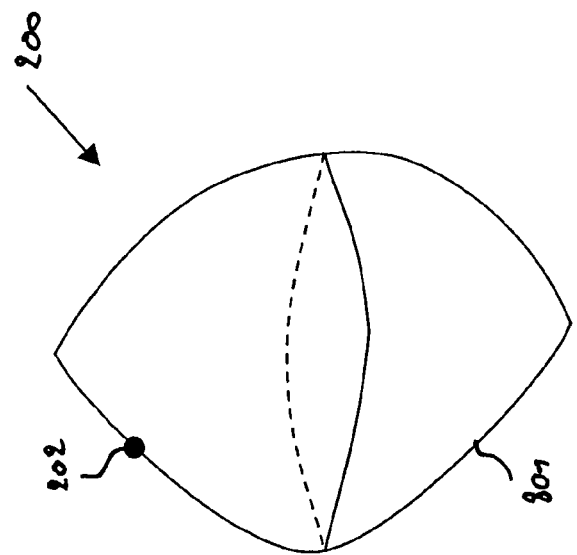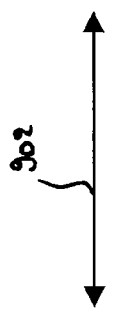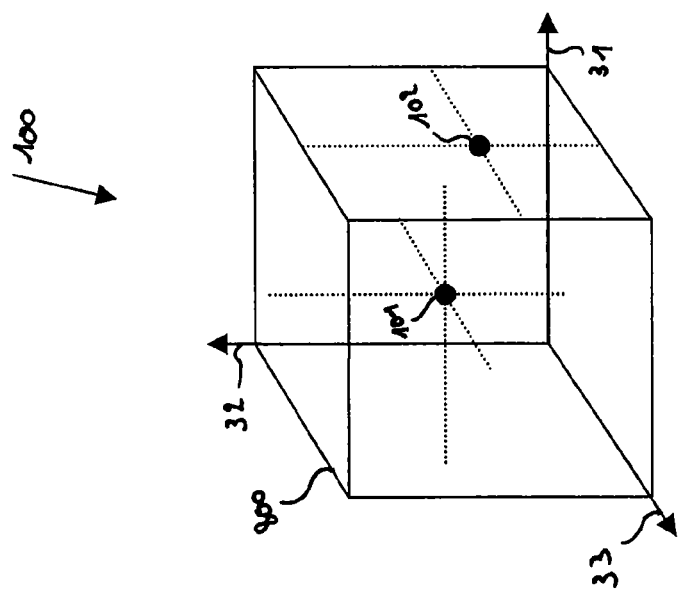
FIG.3

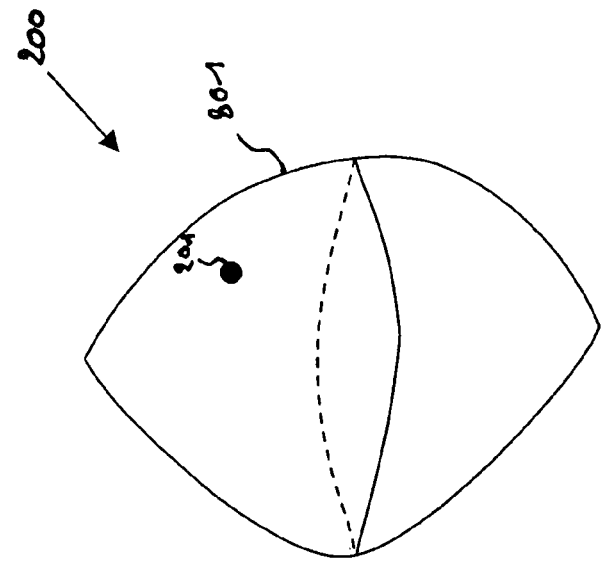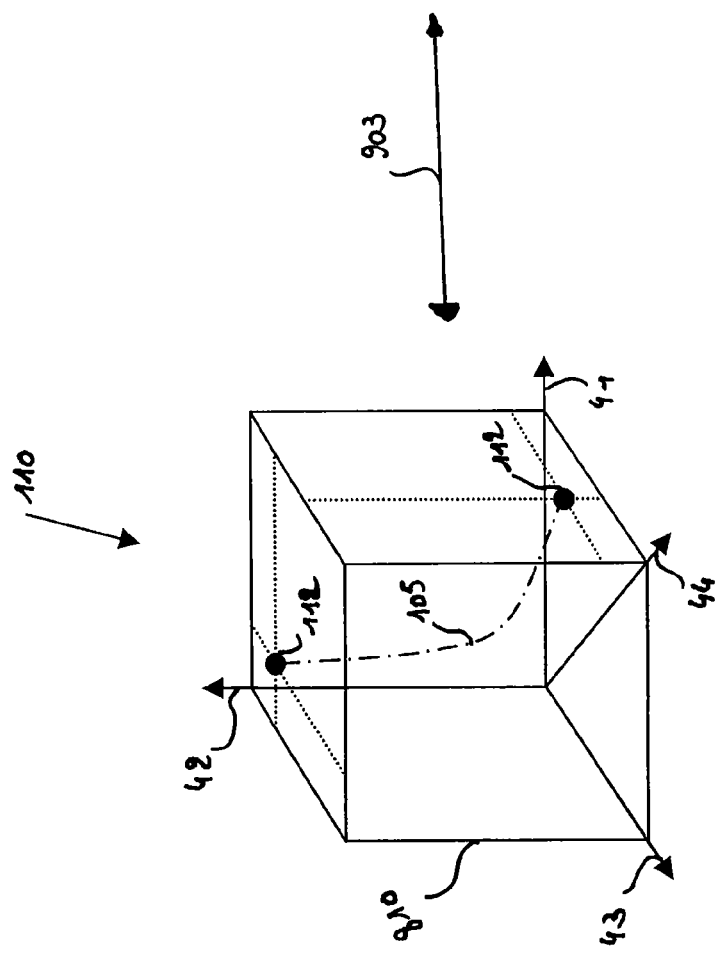
FIG. 5

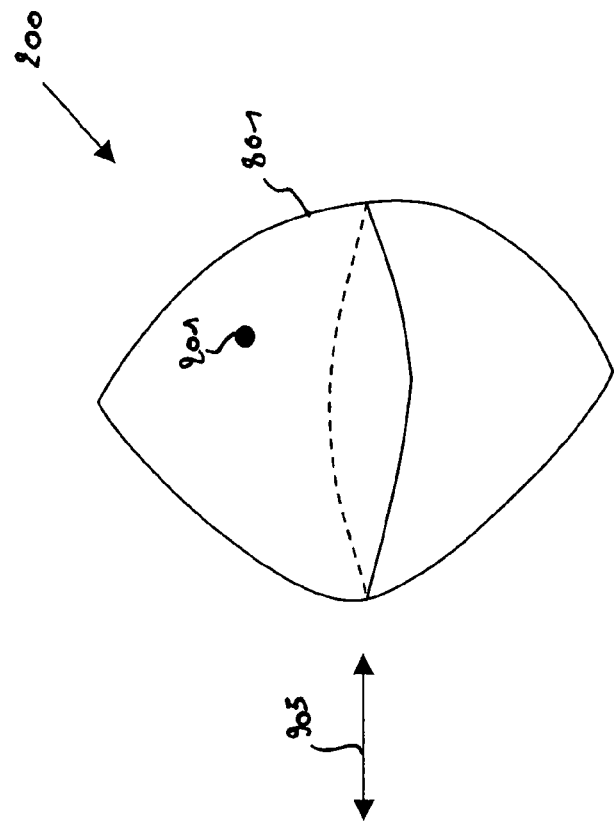
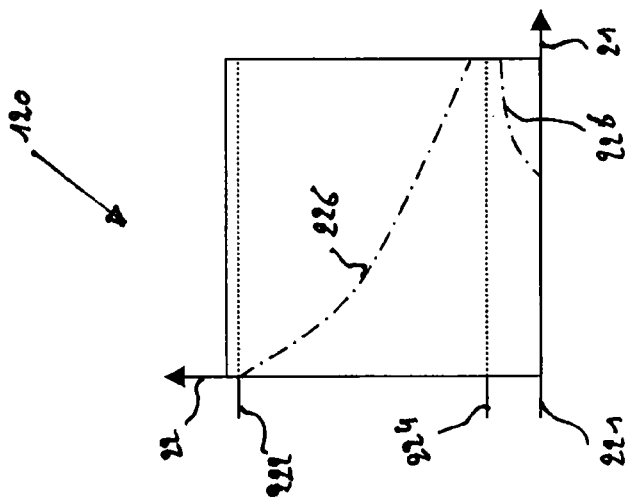
FIG. 7

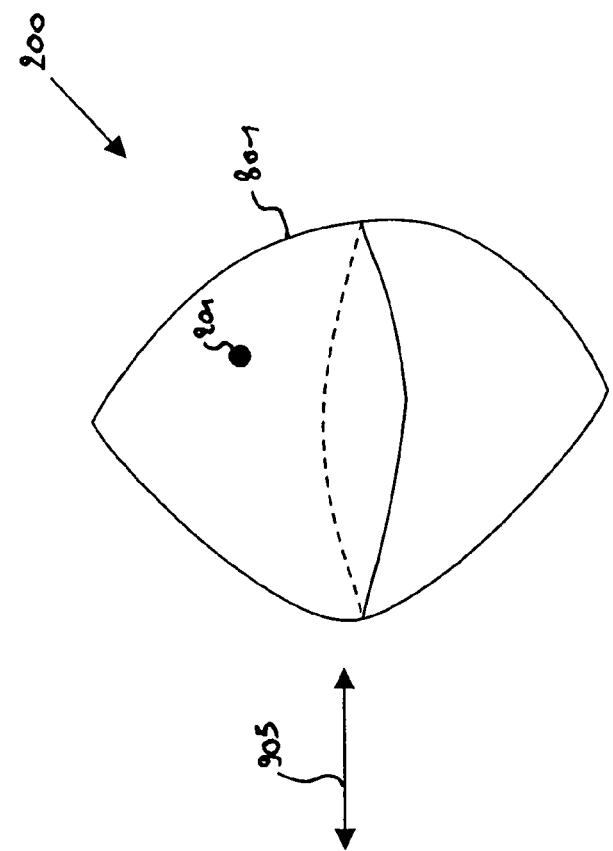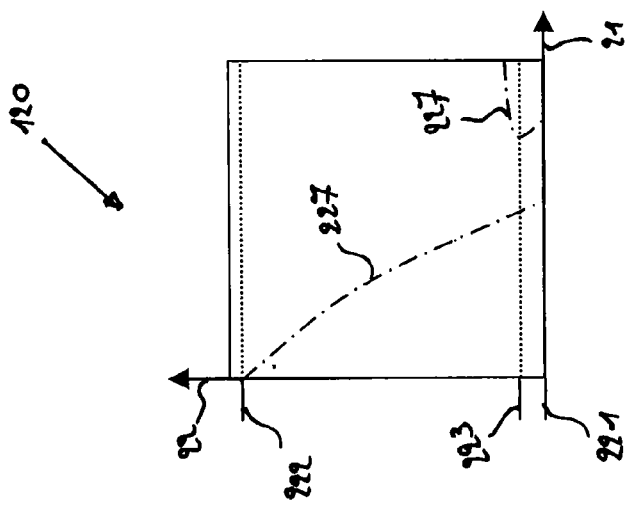
FIG. 10

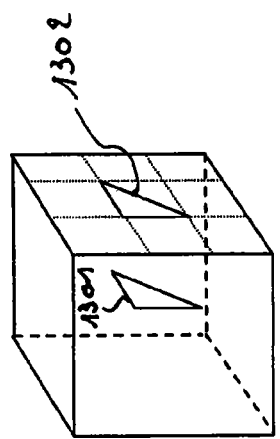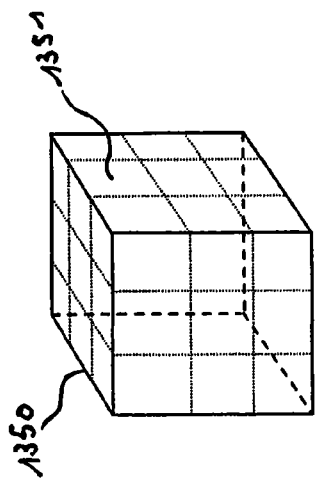
FIG. 13

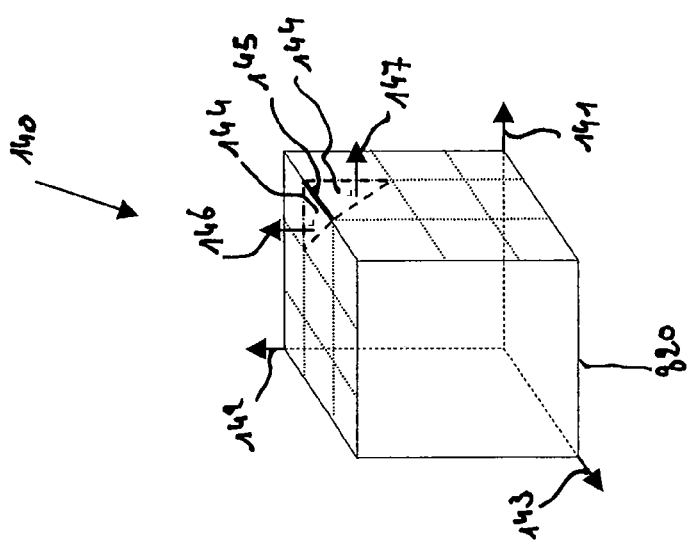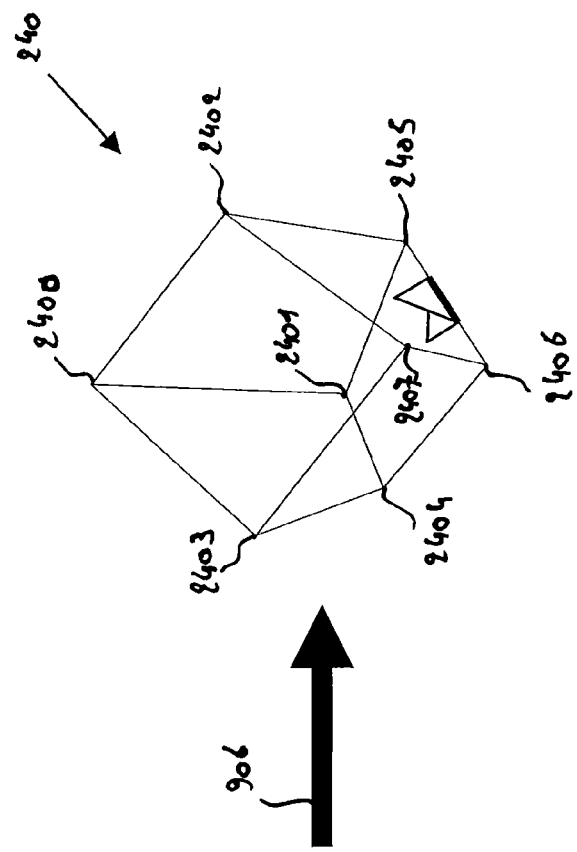
FIG. 16

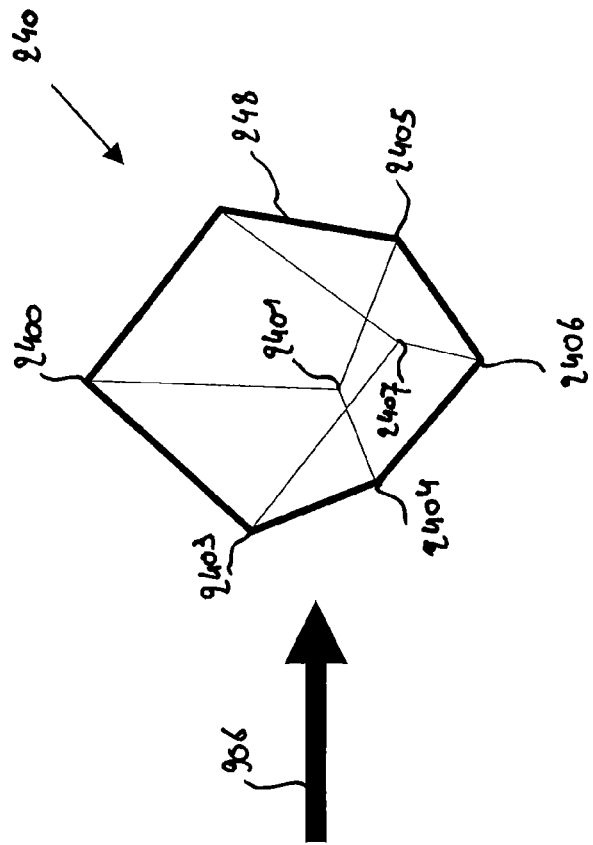
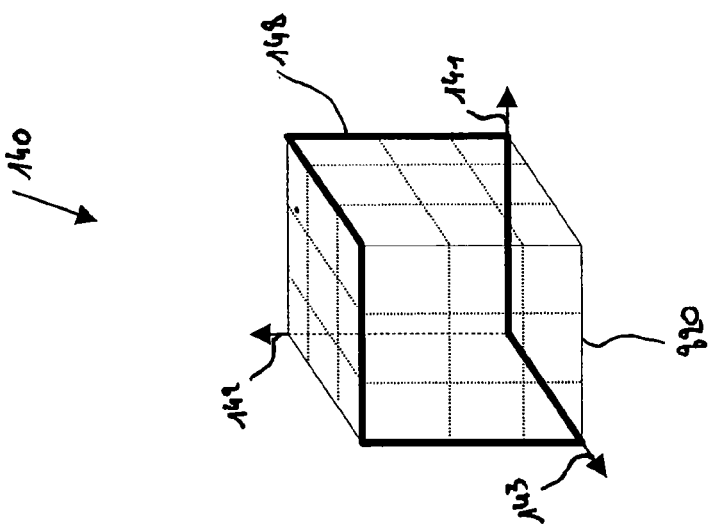
FIG. 17

SYSTEM AND METHOD FOR REGULARIZING AN INK MODEL FOR A COLOR DEVICE

CROSS-REFERENCE TO RELATED APPLICATIONS

This application is a 371 National Stage Application of PCT/EP2013/053480, filed Feb. 21, 2013. This application claims the benefit of U.S. Provisional Application No. 61/603,975, filed Feb. 28, 2012, which is incorporated by reference herein in its entirety. In addition, this application claims the benefit of European Application No. 12156431.4, filed Feb. 22, 2012, which is also incorporated by reference herein in its entirety.

BACKGROUND OF THE INVENTION

1. Field of the Invention

The present invention relates to methods and systems for the reproduction of color documents; the invention especially concerns color management. The invention is particularly suitable for the accurate, stable and continuous reproduction of objects defined by a mixture of inks.

2. Description of the Related Art

Definition and Explanation of Terms

Today, more and more output systems are developed for the reproduction of color images and/or colored text. Several display and printing technologies are used such as CRT's, LCD's, plasma display panels (PDP), electroluminescent displays (ELD), carbon nanotubes, quantum dot displays, laser TV's, Electronic paper, E ink, projection displays, conventional photography, electrophotography, thermal transfer, dye sublimation and ink jet systems, 3D color inkjet systems to name a few. Also the conventional printing technologies such as offset printing, rotogravure, flexography, letterpress printing, and screen-printing are developed for the reproduction of color images and/or colored text. In the rest of this document, these systems will be referred to as color devices or color reproduction devices.

All these systems can be described as multidimensional color devices with n colorants such as CMYK (cyan, magenta, yellow and black) inks of an ink jet system, electrophotography, thermal transfer, dye sublimation, conventional printing systems or RGB (Red, Green, Blue) in case of a display system such as CRT's, LCD's, plasma display panels (PDP), electroluminescent displays (ELD), carbon nanotubes, quantum dot displays, laser TV's, Electronic paper, E ink, projection displays. In this document it is assumed that the colorant values for ink based printers, not addressed with RGB values, range from 0% (no colorant laid down on paper) to 100% (maximum amount of colorant laid down on paper or substrate where the ink based printer is printing on). For RGB based systems such as displays, the values range from 0 to 255. In the rest of this document, mainly a printer will be used as an example of a color device, however, it is well known in the art of color management systems that aspects of the invention, which are disclosed further below, can be easily extended to other color devices, such as displays, color devices which are not RGB based systems and not CMYK based systems, color scanners and digital color cameras.

With colorant space is meant an n-dimensional space with n the number of independent variables with which the color device can be addressed. In the case of an offset printing press the dimension of the colorant space corresponds to the number of inks of the press. As normally CMYK inks are used, the dimension of the colorant space is four. Colorant spaces are also referred to as device dependent spaces. In the rest of this document for ink based color devices CMYK is used as colorant space but also other ink combinations can be used to reproduce color images or colored text.

In the rest of this document for display systems RGB is used as colorant space but also other color combinations can be used to reproduce color images or colored text.

The colorant gamut is defined by all possible combinations of colorant values, ranging from 0% to 100% for non-RGB color devices and from 0 to 255 for RGB based systems. If there are no colorant limitations, the colorant gamut is an n-dimensional cube. However, in most cases also one or multiple ink combinations have to be taken into account as a number of colorant combinations are not acceptable to be printed. Hence the colorant gamut is reduced by these ink limitations. Ink limitations can be any limitation on the colorant combinations to be taken into account. In this document, only linear ink limitations are considered, but all aspects of linear ink limitation can be easily extended to any combination of linear and/or non-linear ink limitations.

With color space is meant a space that represents a number of quantities of an object that characterize its color. In most practical situations, colors will be represented in a three-dimensional space such as the CIE XYZ space, CIELAB or CIECAM02 as color values. However, also other characteristics can be used such as multi-spectral values based on filters that are not necessarily based on a linear transformation of the color matching functions. The values represented in a color space are referred to as color values. Color spaces are also referred to as device independent color spaces wherein a color may be unambiguously specified without reference to external factors. It is well known in the art of color management systems that a method that is using a device independent color space such as the CIE XYZ space, also shall be applicable for other device independent color spaces such as CIE LAB space, CIECAM02, multi-spectral value spaces.

A printer model is a mathematical relation that expresses color values in function of colorant values for a given color device. The variables for the colorants are denoted as $c^1$, $c^2, \ldots, c^n$ with n the dimension of the colorant space. In this document, a printer model defined for a given colorant gamut in colorant space with dimension n is referred to as the n-ink model of the color device. For displays, scanners and digital cameras such a model is also called an n-colorant model. It is well known in the art of color management systems that a method that is using an n-ink model also is applicable for an n-colorant model. It is assumed that the n-ink model is a continuous function from colorant space to color space. Characteristics are defined in most cases for n-ink models, however, as the n-ink model describes the color behavior of the corresponding color device, characteristics defined for the n-ink model are also defined indirectly for the color device. E.g. if the n-ink model is regular, it is said that also the color device is regular. Also the gamut, defined for the n-ink model, is assumed to be the gamut of the color device.

Common general knowledge on the subject matter of color management and printer models are presented by the following standard science handbooks: "Digital Color Halftoning" by Henry R. Kang, 1st edition, ISBN 08194 3318 7, co-published by SPIE, The International Society for Optical Engineering (Year 1999), herein incorporated by reference in its entirety and "Digital Color Imaging" by Gaurav Sharma, ISBN 08493 0900 X, published CRC Press (Year 2003), herein incorporated by reference in its entirety.

The n-ink model is often based on a printer target. Such a target comprises a number of uniform color patches, defined in the colorant space of the color device. In a next step the printer target is printed and measured as color values in a color space, and based on the values of the patches in colorant space and the measured color values, the n-ink model is made. This is also called the profiling or color profiling the printer. A printer target is normally characterized by the sampling points along the different colorant axes. Based on the sampling points a regular grid can be constructed in colorant space of which a number of grid points are contained by the printer target. Hence a target can be said to be complete or incomplete. We refer to patent application EP-A-1 146 726 for more information on grids, complete and incomplete printer targets, and related terms. The positions in the regular grid in the colorant space from the printer and the corresponding color values of a color space, calculated out the measuring of the printer target is as forward look-up-table calculated by the n-ink model. A regular grid is not necessarily needed but it makes the complexity of calculations for color transformations and/or inverting this LUT easier. The measurements of the printer target can also become part of the n-ink model as forward measurement look-up-table. The measurements of the printed targets depend on several printing parameters such as half-toning techniques, pigmentation of the inks, and absorption of the substrate whereon the printed target is printed.

With inverting an n-ink model is meant that for a given color in color space colorant values are looked for that map to the given color by making use of the n-ink model. The transformation of an n-ink model to color space on the other hand is equivalent to the transformation of the corresponding colorant gamut to color space by making use of the n-ink model.

We refer to patent application EP A 1 083 739, "Inverse problems in color device characterization" by Bala Raja, published in PROCEEDINGS OF SPIE, US, vol 5016 23 Jan. 2003, pages 185-195", herein incorporated by reference in its entirety, "Optimization of the spectral Neugebauer model for printer characterization" by R. Balasubramanian, JOURNAL OF ELECTRONIC IMAGING, SPIE/IS&T, vol 8, no. 2, 1 Apr. 1999, pages 156-166, herein incorporated by reference in its entirety, and U.S. Pat. No. 5,878,195 (MAHY MARC), 2 Mar. 1999, herein incorporated by reference in its entirety, for more information on colorant spaces, color spaces, inverting n-ink models and other relevant terms.

Based on an n-ink model, forward and inverse look up tables are constructed. These tables are also referred to as tables or color tables. A forward table transforms colorant values to color values whereas the inverse table transforms color values to colorant values. Inverse tables are also called separation tables or color separation tables. The forward, inverse look up tables and alternatively together with a look up table with the measurements of the print target and their corresponding colorant values can be stored as a profile on 1 or several positions of a computer readable medium. A profile is also called a color profile. For printing systems a profile is also called an output profile or output color profile. For display systems, scanners and digital cameras a profile is also called an input profile or input color profile. A look up table with the measurements of the print target and their corresponding colorant values stored on 1 position of a computer readable medium is called a measurement file.

The International Color Consortium (ICC) specified in 2010 a profile format to include a color profile to provide a cross-platform profile format for the creation of interpretation of color and/or colorant values. Such color profiles can be used to translate between different colorant spaces and/or color spaces and transform colorant values created using a color device into another color device's native colorant space. It is allowed to embed this profile format in page description language-data and/or image-data. International Color Consortium—Specification ICC 1:2010, REVISION of ICC.1:2004-10, (Profile version 4.3.0.0) (Year 2010), herein incorporated by reference in its entirety. This specification is common general knowledge for the engineer on the subject matter of color management.

The routines to calculate and create color profiles from the calculation of an n-ink model out the data of the measurement file and the inverse n-ink model are part of a profile creator, a software application, also called profile maker which is preferably part of a color management system.

Several techniques to create n-ink models are known as prior art and they are mainly based on or combinations of Neugebauer equations, Murray-Davies equations, Yule-Nielsen model, area coverage-density relationship, Clapper-Yule model, dot-gain and preferably piecewise-linear n-ink-model whether or not extended with spectral extensions.

A n-ink model and/or a color profile are used to convert a first colorant values from a first colorant space in a color image or colored text to another colorant value from a second colorant space with as purpose to reproduce the first colorant value in the second colorant space with approximately the same color value of the first colorant value which is the basic of a color management system.

When rendering colors on color devices, in most cases separation tables are made for CMY (with C cyan, M magenta and Y yellow), RGB (with R red, G green and B blue) and CMYK (with C cyan, M magenta, Y yellow and K black) color devices. These tables are in general based on a regular grid in color space that defines per grid point the colorant values to be printed to obtain the correct color for that grid point on the color device. The colorant values are calculated by constructing an n-ink model and a technique to invert the n-ink model for the color corresponding to the grid points. This is in general done grid point by grid point without explicitly checking if a colorant combination of a given grid point to a succeeding grid point is continuous. This is important as at the moment the separation table is applied, an interpolation technique will be used to get the colorant values for the colors between the given grids points. If the interpolation between the grid points in reality does not correspond to the color reproduction behavior of the color device, the resulting color will not be color-accurate.

For an RGB or CMY three-ink model, there is in general a one to one relation between the three-dimensional colorant values and the color values (FIG. 1). In this case the three-ink model and the corresponding color device is said to be regular. Hence, for a regular color device or three-ink model, a well-chosen interpolation between two succeeding color values of a corresponding separation table is automatically stable, accurate and continuous.

However, there are several exceptions. Three-ink models for which the 300% overlay of colorants is not transparent or almost not transparent, results in a number of double solutions of certain colors (FIGS. 2 and 3). These three-ink models and corresponding color devices are said to be singular (i.e. an n-ink model and corresponding color device that is not regular is called singular). Another class of examples are non conventional three ink combinations different from previously mentioned RGB or CMY colorants. An example is a Yellow, Green and Cyan (YGC) color device, where some combinations of yellow and cyan match a certain percentage of green. Hence, for these color devices, some color values are made with multiple colorant combinations. In general a finite number of colorant combinations will be found, and typically there will be two. If however, a continuous set of colorant combinations for a three-ink model result in the same color value, the three-ink model and corresponding color device is said to be degenerated. This situation will not be discussed in this document, as in general a degenerated three-ink model can be easily converted into a non-degenerated three-ink model by modifying some model parameters slightly. If there are two neighboring color values in a separation table for which one color value can only be reproduced with one colorant combination but for the other one multiple solutions exist, in general only for one solution the interpolation between both grid points results in a continuous color change in print. Hence, with the current state of the art, the wrong colorant combination can be selected so that prints based on these separation tables will show severe banding artifacts and unexpected rainbow effects (FIG. 4).

For a conventional CMYK four-ink model, a unique relation is expected between a color value and a connected path in colorant space. If the color lies inside the color gamut, there is a connected path in the colorant space with which this color can be obtained, and that starts and ends at the colorant boundary (FIG. 5). If the color lies at the color gamut boundary, there is exactly one colorant combination with which this color can be reproduced (FIG. 6). The selection of the proper colorant combination for a given color value is based on the GCR/UCR selection (Remark: GCR stands for gray component replacement and UCR for under color removal; these well-known techniques pertain to replacing CMY values that add to gray by K, and in how far to replace them. For GCR/UCR and also for other terms with respect to color management and color reproduction, we refer to Yule, "Principles of Color Reproduction", Wiley & Sons, 1967). As GCR/UCR selection values are changed continuously in color space, the colorant combinations between two succeeding grid points in separation tables are changing slowly too, so that for most used interpolation techniques nowadays the interpolation results in smooth color separations. Hence a smooth relation between color values and colorant values is obtained. If however, the GCR/UCR settings are changed suddenly, suppose from the minimum K solution to the maximum K solution, from one grid point to the next one, the interpolated colorant values between both grid points are likely to be incorrect. By a proper selection of GCR/UCR values, the separations for CMYK four-ink models will result in stable, accurate and smooth color printing. In other words, for a proper selection of GCR/UCR values every connected path in color space is mapped to a connected path in colorant space (FIG. 7).

However, also for CMYK four-ink models, a number of assumptions are made in making separation tables that are not always valid. In applying GCR/UCR settings, it is often assumed that there is a unique relation between the K value and the path in colorant space that results in the same color; i.e. if the path is projected on the K axis, there is always one point on the path with a given K-value between the minimum and maximum K value of the projection. This also means that one end point of the path maps to the minimum K-value whereas the other end point maps to the maximum K-value. If for a given color there is one connected path, but the relation to the K axis is not as explained above, this might result in non-continuous separations. In general, if a four-ink model is inverted for a given color, often first of all the minimum and maximum K solution are looked for. A given GCR/UCR setting is than applied as a percentage between the minimum and maximum K solution. Hence, in some cases this results in two, three or more than three possible colorant combinations if the path in colorant space that maps to the given color values goes up and down along the K-axis in colorant space (FIG. 8). Also in this case, the interpolation between two succeeding grid points results in severe banding or rainbow effects if for one grid point the "wrong" colorant combinations are selected compared to the other grid point (i.e. in case multiple solutions for a given GCR/UCR value are available for one of them).

For some four-ink models, the colorant combinations in colorant space resulting in a given color in color space, do not belong to one connected path but to multiple non-connected paths in the colorant domain. In this case, a given GCR/UCR value (and hence a corresponding K-value) can not always be reached if the projection of both paths on the K-axis is disconnected and one path contains the minimum K solution and the other the maximum K solution (FIG. 9). In other cases, these paths project partially on the same region along the K value so that again multiple solutions can be obtained for a given GCR/UCR setting (FIG. 10). Also in this case, the interpolation between two succeeding points can result in severe banding and rainbow effects as there is no continuous relation between the color values and the colorant values.

Another assumption for CMYK four-ink models is that K exchanges for CMY combinations, i.e. if a color can be obtained with a given combination of CMYK values, the same color can be obtained by increasing the K value and decreasing the CMY values (and vice versa). Calculations however indicate that this is not always the case. In general this occurs for neutrals but for non-neutrals this assumption is not always valid. Hence all GCR/UCR techniques that are based on this assumption will fail to get accurate colors. Also imposing ink limitations are often applied in this way, i.e. increasing K-values often means a reduction of the CMY colorant values so that less ink is used. Ink limitations based on this technique therefore will also fail to maintain the correct color.

For non-CMYK four-ink models on the other hand several types of non conventional printing behavior occur. Hence, there is no guarantee that a separation table results in smooth color printing, stable color reproduction and accurate colors.

SUMMARY OF THE INVENTION

Embodiments of the present invention can reduce or eliminate deficiencies and problems associated with the prior art devices and methods. Embodiments of the herein disclosed methods and systems can be used to render colors on color devices in such a way that the color is reproduced in a stable way, and/or accurately, and/or such that the relation between color values and colorant values is continuous.

Embodiments of the present invention also relate to software, firmware, and program instructions created, stored, accessed, or modified by processors using computer-readable media or computer-readable memory. The methods described may be performed on a variety of computing devices, and peripherals, including color devices preferably displays and more preferably printing devices.

FIG. 19 illustrates an exemplary block diagram of a system 1900 using one or more computing devices 1910a 1910b coupled to an output device, which is shown as exemplary printer 1970, according to disclosed embodiments. Note that, in general, the methods disclosed may be performed on any graphic processing device that is capable of performing color conversion operations including computing device 1910, exemplary printer 1970 shown in system 1900 in FIG. 19, and/or other devices that perform color space conversions, color management, and/or color translations. In some embodiments, the devices may receive input in a first colorant space and produce output in a second colorant space, which in some instances may be different from the first colorant space. The methods and apparatus described in this document may also be applied to the above device types with appropriate modifications and in a manner consistent with embodiments disclosed herein as would be apparent to one of ordinary skill in the art. For simplicity and ease of explanation, however, the methods are described with reference to exemplary printer 1970.

In general, printer 1970 may be any printing system. Printer 1970 may have image transmitting/receiving function, image scanning function, and/or copying function, as installed in facsimile machines and digital copiers. The methods and apparatus described in this document may also be applied to these various printer device types with appropriate modifications and in a manner consistent with embodiments disclosed herein.

A printer 1970 may contain one or more input-output ports 1975, and printer 1970 may be able to communicate with and access resources on computing device 1910 using I/O ports 1975 and connection 1920. Printer 1970 may receive input print data, including colorant or color values and other data from one or more computing devices 1910a, 1910b. For example, a computing device 1910a, 1910b may be a general purpose computer that includes a monitor to display the input color or colorant values.

One or more of the computing devices 1910a 1910b may be coupled to printer 1970 via a wired or wireless connection 1920 using conventional communication protocols and/or data port interfaces. In general, connection 1920 can be any communication channel that allows transmission of data between the devices. In one embodiment, for example, the devices may be provided with conventional data ports, such as parallel ports, serial ports, Ethernet, USB™, SCSI, FIREWIRE™, and/or coaxial cable ports for transmission of data through the appropriate connection. The data port may be a wired or wireless port.

The printer 1970 may further include bus 1974 that couples CPU 1976, firmware 1971, memory 1972, print engine 1977, and secondary storage device 1973. Printer 1970 may also include other Application Specific Integrated Circuits (ASICs), and/or Field Programmable Gate Arrays (FPGAs) 1978 that are capable of executing portions of routines from 1 or more the computing devices and color management routines.

The printer 1970 may also be capable of executing software including a printer operating system and other appropriate application software, including software to perform color management functions and image data processors.

The CPU 1976 may be a general-purpose processor, a special purpose processor, or an embedded processor. CPU 1976 can exchange data including control information and instructions with memory 1972 and/or firmware 1971. Memory 1972 may be any type of Dynamic Random Access Memory ("DRAM") such as but not limited to SDRAM, or RDRAM. Firmware 1971 may hold instructions and data including, but not limited to, a boot-up sequence, pre-defined routines, routines to perform color management, including color space conversions, luminance computations and part of routines from 1 or more of the computing devices 1910a, 1910b. The code and data in firmware 1971 may be copied to memory 1972 prior to being acted upon by CPU 1976. In some embodiments, data and instructions in firmware 1971 may be upgradeable.

The firmware 1971 may also include routines to perform color or colorant space conversion related computations, profile creation, profile regularization and part of routines from 1 or more of the computing devices 1910a, 1910b, and store the values and profiles in memory 1972. The routines may include code that can be executed by CPU 1976 and/or computing device 1910 to perform portions of computations related to the determination, profile or n-ink-model creation and processing of in-gamut and out-of-gamut colors. Routines in firmware 1971 may also include code to process the input color and related color space or the input colorant and related colorant space information received from computing device 1910, as well as gamut-mapping functions.

It is also contemplated that portions of routines to perform one or more color management related computations may be stored on a removable computer readable medium, such as a hard drive, computer disk, CD-ROM, DVD ROM, CD.+-.RW or DVD.+-.RW, USB flash drive, memory stick, or any other suitable medium, and may run on any suitable subsystem of printer 1970. For example, portions of applications to perform computations related to profile and n-ink-model calculation, gamut mapping and processing may reside on a removable computer readable medium and be read and acted upon by CPU 1976 using routines in firmware 1971 that have been copied to memory 1972.

The CPU 1976 may act upon instructions and data and provide control and data to ASICs/FPGAs 1978 and print engine 1977 to generate printed documents. In some embodiments, ASICs/FPGAs 1978 may also provide control and data to print engine 1977. FPGAs/ASICs 1978 may also implement one or more of translation, compression, and color conversion algorithms and part of routines to create color profiles.

Exemplary secondary storage 1973 may be an internal or external hard disk, Memory Stick™, a computer readable medium or any other memory storage device capable of being used in and/or coupled to printer 1970. Memory to store computed values, look-up tables and/or color profiles may be a dedicated memory or form part of a general purpose memory. The memory may be dynamically allocated to hold the look-up tables and/or profiles as needed. The memory allocated to store the look-up tables may be dynamically released after processing.

1 or more of the computer devices may include an image data processing system, preferably a raster image processor and it may include a profile maker.

The routines for storing and/or reading a color profile, forward look-up-table, inverse look-up-table and/or measurement file on/from a computer readable medium, memory or secondary storage by using I/O ports 1975 may be included in 1 or more of the computing devices. Selecting one of the look-up-tables such as a forward look-up-table, inverse look-up-table or measurement file of a color profile and storing on a computer readable medium, memory or secondary storage by using I/O ports 1975 may also be included in 1 or more of the computing devices. The file management of the stored profiles, forward look-up-tables, inverse look-up-tables and/or measurement files is done by a profile file manager which includes preferable a profile database wherein also extra information about the color profiles such as date of printing the printer target, version number of profile creator, version number of profile regularizator, version number of printer target, name of printer 1970, characterization of the printer is managed and stored.

The routines to create an n-ink model out a profile or a measurement file, to inverse an n-ink model may be included in 1 or more of the computing devices or to regularize an n-ink model may be included in 1 or more of the computing devices. The routines to regularize an n-ink model are part of a profile regularizator and may be stored on a computer readable medium.

In order to overcome the problems of the prior art, preferred embodiments of the present invention provide a regularization method as described below, an image data processing system as described below, a computer program and a computer readable medium as described below.

The use of a matt varnish, gloss varnish on printer systems and preferably inkjet printers and more preferably UV inkjet printers to enhance the print quality is well known in the graphical industry. By using a printed printer target comprising uniform color patches with extra sampling points so a regular grid can be constructed in a n-dimensional space with (n−x) the number of independent variables with which the color device can addressing color and x independent variables with which the color device can addressing the amount of varnish or primer and by measuring the printed printer target in a space that represents a number of quantities of an object that characterized its color and gloss, according to the embodiments of the present invention it can easily be extended with the gloss characterization. The forwarded, inverted LUT and other LUT as defined in the Specification ICC 1:2010 of the ICC can be preferably adapted to extent the color and colorant values with the gloss characterization. The embodiments of the invention can be extended with this gloss characterization and gloss measurement alongside of the colorant and color values. The embodiments of the invention can be extended with other characterization and measurements alongside the colorant and color values such as mottle, coalescence, matt-effects, relief structures, color bleeding, matt-effect, gloss or metamerie. The forwarded, inverted LUT and other LUT as defined in the Specification ICC 1:2010 of the ICC can than be preferably adapted to extent the color and colorant values with 1 of more of these characterizations.

Embodiments of the invention provide a technique that guarantees that a color separation table is well-behaving; i.e. the separation table generates accurate colors, stable color reproduction by limiting the colorant domain properly and a smooth relation between color values and colorant values so that smooth color gradations or vignettes are well reproduced.

If a color separation table also called inverse look-up-table of a color profile is well-behaving, the color profile is called a well-behaving color profile. The color separation table is than called a color well-behaving separation table.

If a color separation table also called inverse look-up-table of a color profile is regular, the color profile is a well-behaving color profile and also called a regular color profile. The color separation table is than s color well-behaving separation table also called a color regular separation table.

To obtain well-behaving color separation tables, there is a need
for a check to see if an n-ink model is singular or if the behavior is due to measurement errors;
for a check based on a measurement file to see which measurements are anomalous (e.g. not properly measured) and which measurements really represent the behavior of the color device;
to adjust a measurement file so that a regular n-ink model is obtained;
to limit the colorant space properly if the n-ink model is singular in certain parts of the colorant domain;
to make an n-ink model regular;
to check if a separation table is well-behaving or not
for a technique that indicates which part of the separation table is not well-behaving;
for a technique to select a colorant combination out of a set of colorant combinations to make well-behaving separation tables;
to detect the paths that map to the same color in color space;
for a generalized concept for GCR/UCR settings;
a regular n-ink model remains regular after a closed loop iteration.

The profile regularization can be used while creating a color profile in a profile creator, after the creation of a color profile, before rendering an image from a first colorant space to a second colorant space or during rendering an image from a first colorant space to a second colorant space. The profile regularizator includes 1 or more routines of color profile characteristics which indicate the regularity of a profile and/or N-ink-model.

According to an aspect of the invention, the invention provides in one of the embodiments the following method and system: generating a color profile, which include a forward look-up-table and an inverse look-up-table for a printing device comprising the steps of:
(a) creating an n-ink model out the data of a measurement file created for the color device or out the data of the forward look-up-table of a color profile from the color device which is suitable for transferring a set of colorant values in colorant space to a set of color values in color space;
(b) creating an inversed n-ink model from the n-ink model or from the inverse look-up-table of the color profile, also called a color separation table;
(c) converting the n-ink model in a forward look-up-table;
(d) converting the inverse n-ink model in a inverse look-up-table;
Characterized by extra steps after creating the n-ink model:
(e) selecting a color profile characteristic;
(f) determining if the n-ink model is not regular based on the color profile characteristic with one or more values and/or value ranges;
(g) optimizing by modifying the n-ink model if the n-ink model is not regular;
(h) optionally repeating step (e) until (f) until the n-ink model is regular Steps (a) until (d) are common general knowledge on the subject matter of color management and may be computer implemented method. The routines for these steps (a)-(h) may be included in 1 or more of the computing devices. These parts may be part of a profile creator or profile regularizator but preferably part of an image data processor, more preferably part of a raster image processor and most preferably part of a color management system on the color device. After the creation of the profile the profile shall be stored on the color device on a computer readable medium, memory or secondary storage of the color device.

The method can also be used to modify the n-ink model if the n-ink model in a part of color space and/or colorant space of the n-ink model is regular. Or the method can also be used to modify the n-ink model in a close-loop until the n-ink model is in a part of color space and/or colorant space of the n-ink model is regular.

The n-ink-model is preferably based on a piecewise-linear n-ink-model but other techniques based on or combinations of Neugebauer equations, Murray-Davies equations, Yule-Nielsen model, area coverage-density relationship, Clapper-Yule model, dot-gain and preferably piecewise-linear n-ink-model whether or not extended with spectral extensions can also be used.

The optimizing of the n-ink model may include constructing of an error functional R and preferably minimizing the error functional R which is preferably done by using the gradient method.

If the color device is a three-ink-color device and wherein the n ink model is a three-ink model, the method and system comprises further the steps of:
 decomposing the three dimensional colorant cube into a union of tetrahedrons;
 approximating an original three-ink model for the three-ink color device by said piecewise linear three-ink model, wherein said piecewise linear three-ink model comprises a plurality of Jacobian matrices, of the original three-ink model, for the tetrahedrons;
 and wherein said color profile characteristic is the plurality of signs of the determinants of the plurality of Jacobian matrices.

The routines for these steps may be included in 1 or more of the computing devices.

If the color device is a four-ink-color device and wherein the n ink model is a four-ink model, the method and system comprises further the steps of:
 decomposing the four dimensional colorant cube into a union of pentahedrons;
 composing said piecewise-linear four-ink model of a plurality of linear models defined in said pentahedrons;
 determining a characteristic vector field of said four-ink model defined in said pentahedrons;
 wherein the color profile characteristic is the sign signature of the characteristic vector field.

The routines for these steps may be included in 1 or more of the computing devices.

If the color device is a n-ink-color device wherein n is larger than four wherein the selected n-ink model comprises a plurality of piecewise linear four-ink models, each piecewise linear four-ink model being for a subset of four of the n inks, and wherein the color profile characteristic is the plurality of sign signatures of the characteristic vector fields of said plurality of piecewise linear four-ink models.

The routines for these steps may be included in 1 or more of the computing devices.

Further explanation and definitions of a regular n-ink model, color profile characteristics, error functionals and examples of optimizing techniques to modify a n-ink model to a regular n-ink model can be found in following description.

Regular Three-Ink Model

A three-ink model is regular if there is a one to one relation (bijective transformation) between the three-dimensional colorant space and the three-dimensional color space.

Regular Four-Ink Model

A four-ink model is regular if
 all colorant combinations resulting in the same color in color space lie on one connected path in the colorant gamut.
 all paths resulting in the same color in color space start and end at the boundary of the colorant cube.
 for all colors at the boundary of the color gamut, there is just one colorant combination at the boundary of the colorant domain to obtain this color.

Strictly Monotonic Regular Four-Ink Model

A regular four-ink model is called a strictly monotonic regular four ink model if the projection of every path, that maps to the same color in color space, on each colorant axis is strictly increasing or decreasing. For a CMYK four-ink model in particular, the path is expected to be decreasing along the K-axis and increasing along the cyan, magenta and yellow axes (FIG. 11).

Criteria for n-Ink Models

To define and check criteria for n-ink models, the n-ink model is approximated by a piecewise-linear model. As the piecewise-linear model is assumed to reflect the behavior of the n-ink model, the criteria for the n-ink model are assumed to be similar to those defined and checked for the piecewise-linear model. In reality this is not always the case, but in practice this assumption is valid for a large number of n-ink models. Hence, only criteria have to be defined and checked for piecewise-linear models.

In a number of cases, criteria can be defined and evaluated for non piecewise-linear models. The localized Neugebauer equations (see Yule, "Principles of Color Reproduction", Wiley & Sons, 1967) are an example of such an n-ink model. However, in this document we will not give examples of more complicated n-ink models as the piecewise-linear approximation can be used in all circumstances; i.e. the accuracy of the approximated piecewise-linear model can be increased to any desired level by splitting up the colorant domain in sufficient small regions. In general, any n-ink model can be approximated by a piecewise linear model where each linear model is based on the Jacobian matrix of the n-ink model.

To define if an n-ink model is regular or not, one or multiple characteristics of the n-ink model, also referred to as printer characteristics or profile characteristics or color profile characteristics, are defined and evaluated compared to a set of one or more values and/or ranges for the printer characteristic, also called color profile characteristics. Criteria with the required values and or ranges used to check if a color device is regular or not will be referred to as regularity criteria. As discussed before, regularity criteria will be dined mainly for piecewise-linear n-ink models, however in most cases these concepts can be easily extended for non piecewise-linear models.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 shows a problem to be avoided for a three-ink process with the colorants red, green and blue: case color 202 at gamut boundary 801 in color space 200 that can be obtained with two colorant combinations 101, 102 in the colorant cube 800; one inside 101 and one 102 at the boundary of the colorant cube 800.

FIG. 5 shows a wanted behavior of a four-ink process with the colorants cyan, magenta, yellow and black: in-gamut color 201 in color space 200 that can be obtained with a connected path 105 inside the colorant space 110 that starts and ends at the colorant boundary 810.

FIG. 9 shows a problem with a four-ink process with the colorants cyan, magenta, yellow and black: an in-gamut color 201 can be obtained with two paths 226 in colorant space 120, where the colorant combinations are not connected 224.

FIG. 10 shows a problem with a four-ink process with the colorants cyan, magenta, yellow and black: an in-gamut color 201 can be obtained with two paths 227 in colorant space 120, where the colorant combinations are not connected and both paths have the same black value 223 for some points.

FIG. 13 shows a division of a three-dimensional colorant cube 1350 in cells 1351 and an example of an internal face 1301 and a boundary face 1302.

FIG. 16 shows a singular face for a three-ink process where one colorant is black and its mapping 906 to color space 240.

FIG. 17 shows singular faces for a regular three-ink process where one colorant is black and their mappings 906 to color space 240.

LIST OF REFERENCE SIGNS

Figure 1:
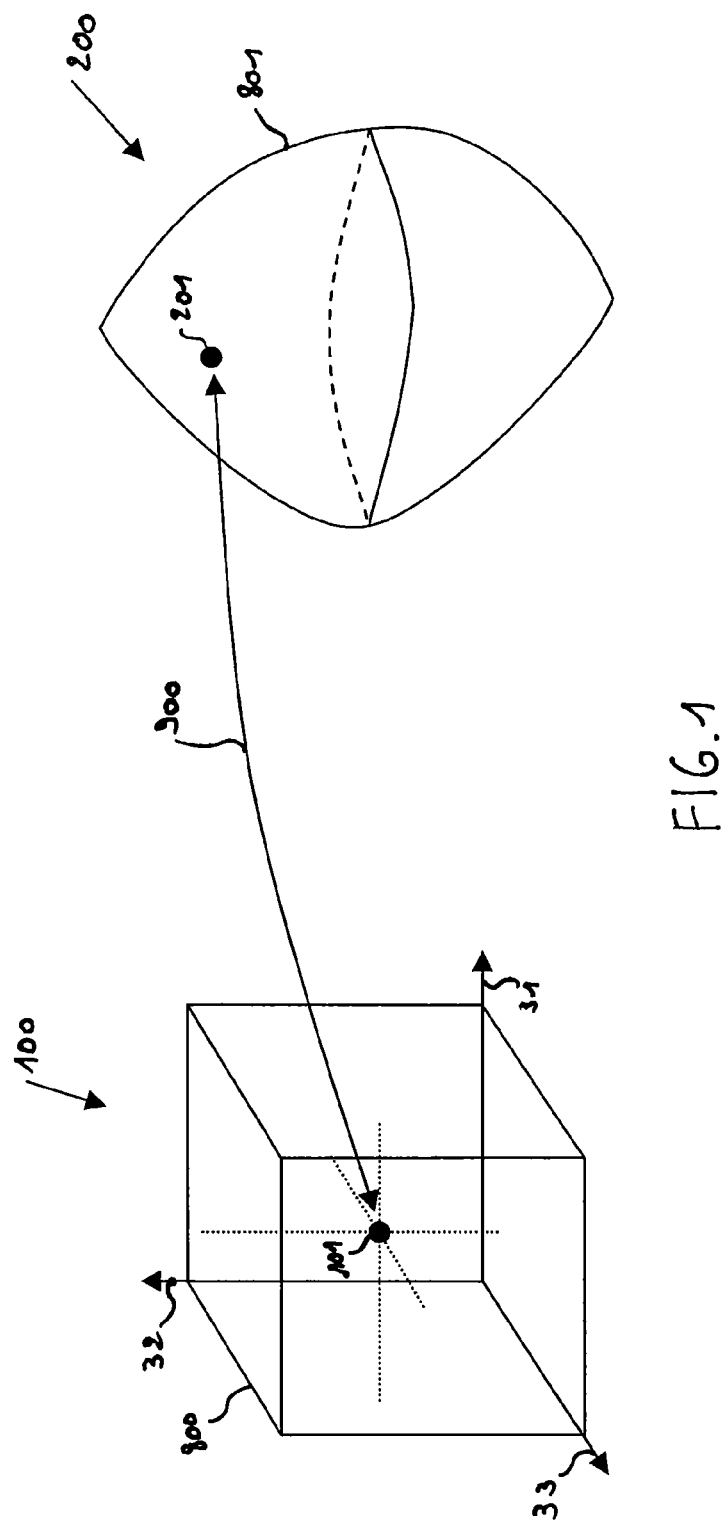
FIG. 1 shows a wanted behavior of a three-ink process with the colorants red, green and blue: there is a unique mapping 900 between color values 201 and colorant values 101.
Figure 2:
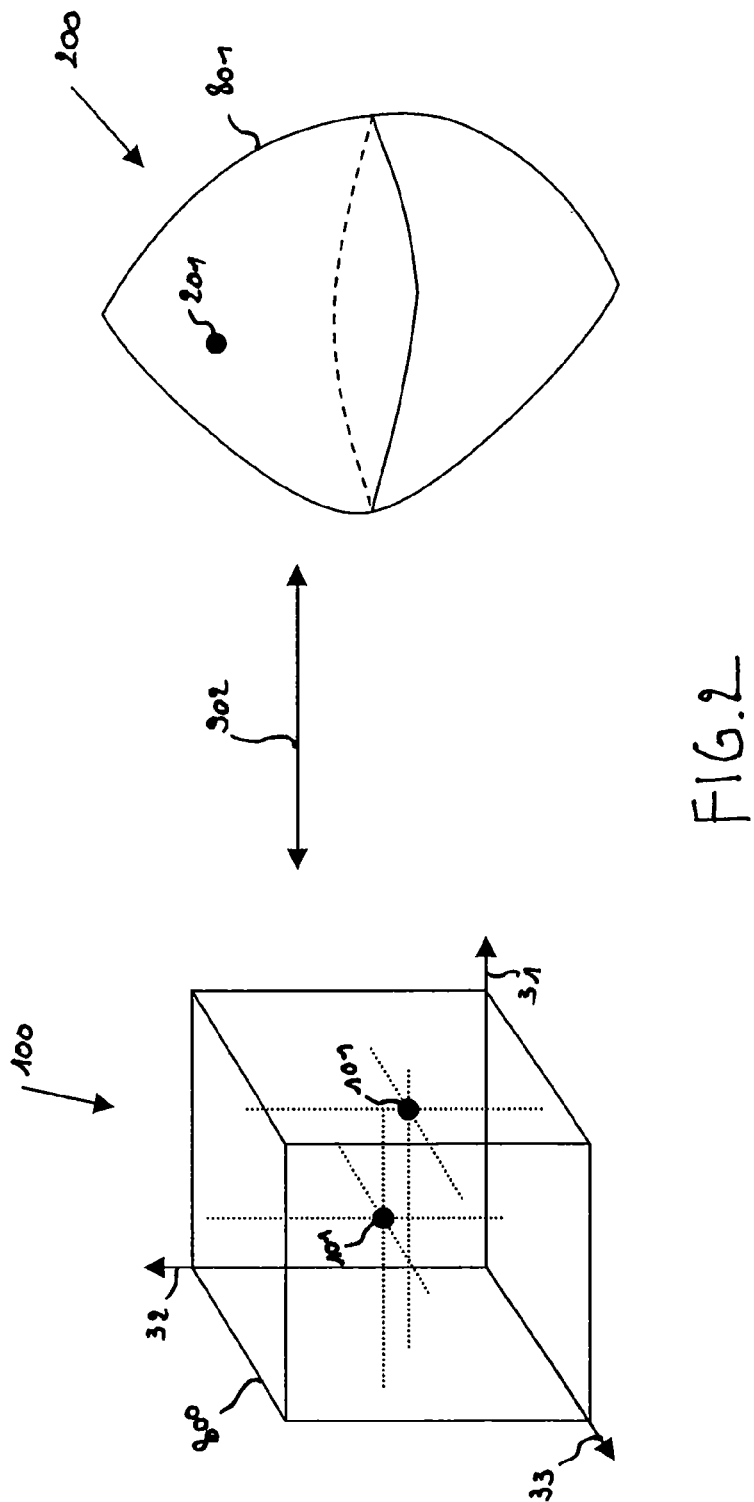
FIG. 2 shows a problem to be avoided for a three-ink process with the colorants red, green and blue: case in-gamut color 201 in color space 200 that can be obtained with two colorant combinations 101 inside the colorant cube 800 in the colorant space 100.
Figure 4:
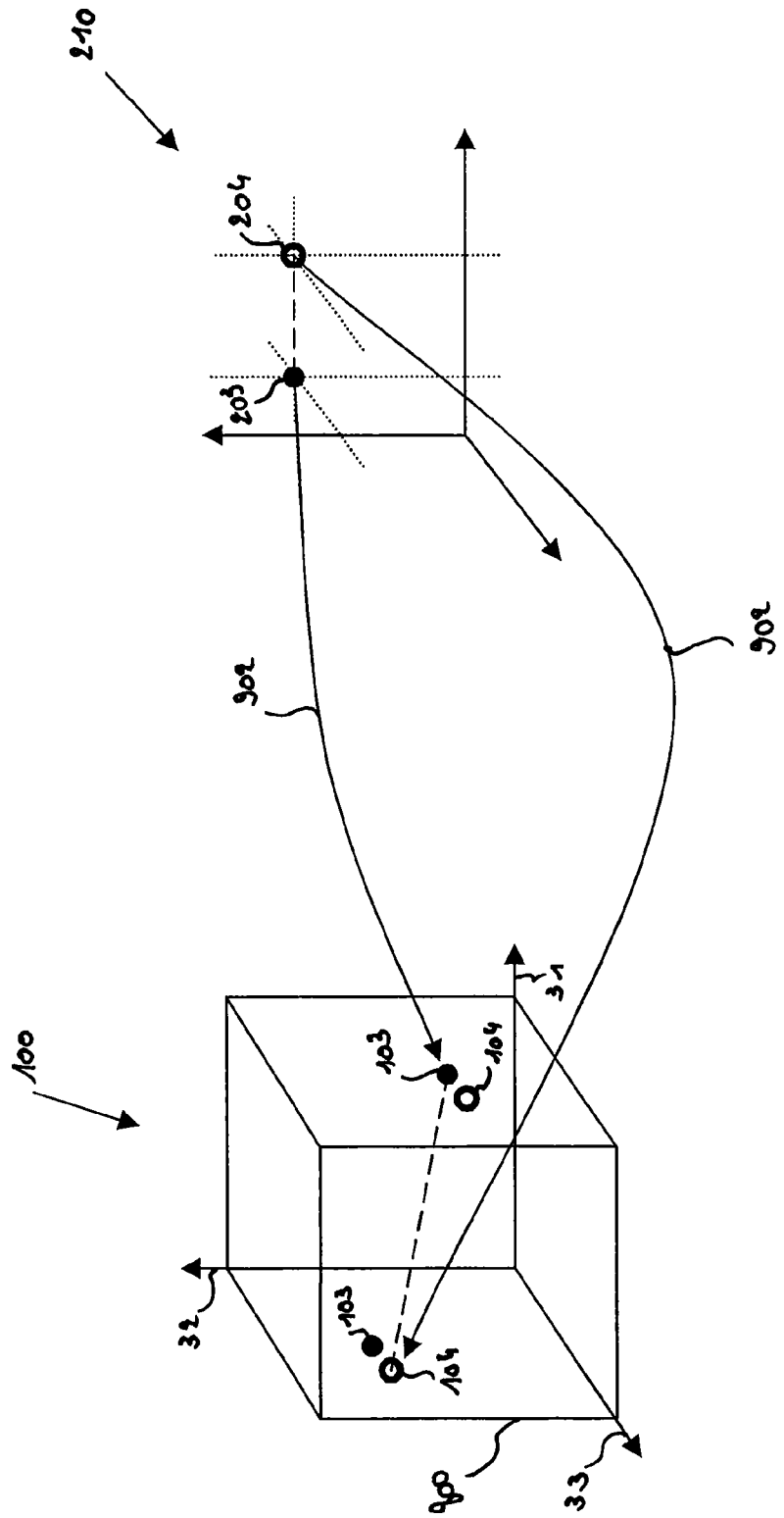
FIG. 4 shows a rainbow effect to be avoided for a three-ink process with the colorants red, green and blue, if per color multiple colorant combinations are available: succeeding sampling points 203, 204 of a separation table in color space map 201 to improper colorant combinations 103, 104.
Figure 6:
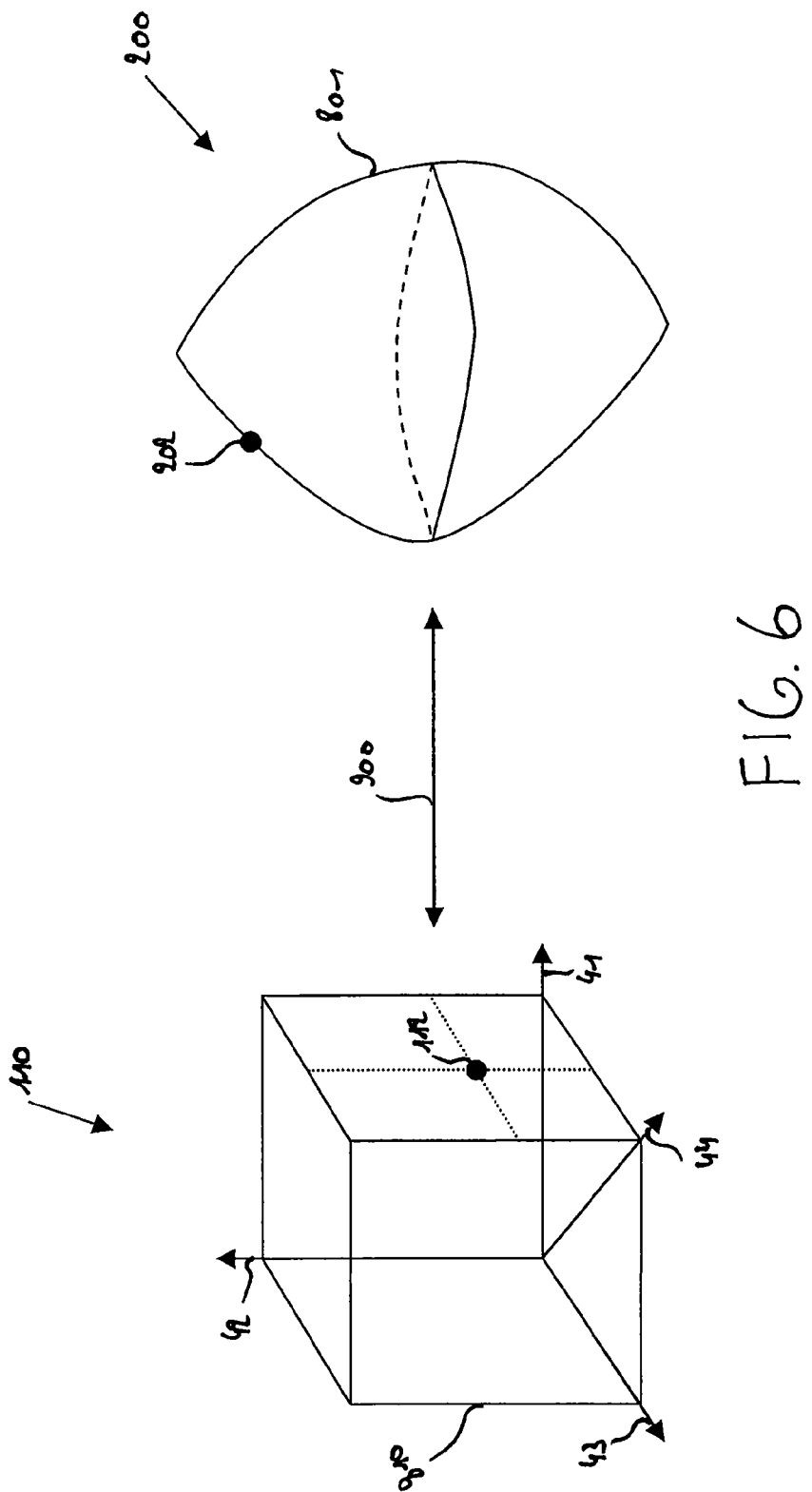
FIG. 6 shows a wanted behavior of a four-ink process with the colorants cyan, magenta, yellow and black: a color 202 at the gamut boundary 801 can be obtained with one colorant combination 112 at the colorant boundary 810.
Figure 7:
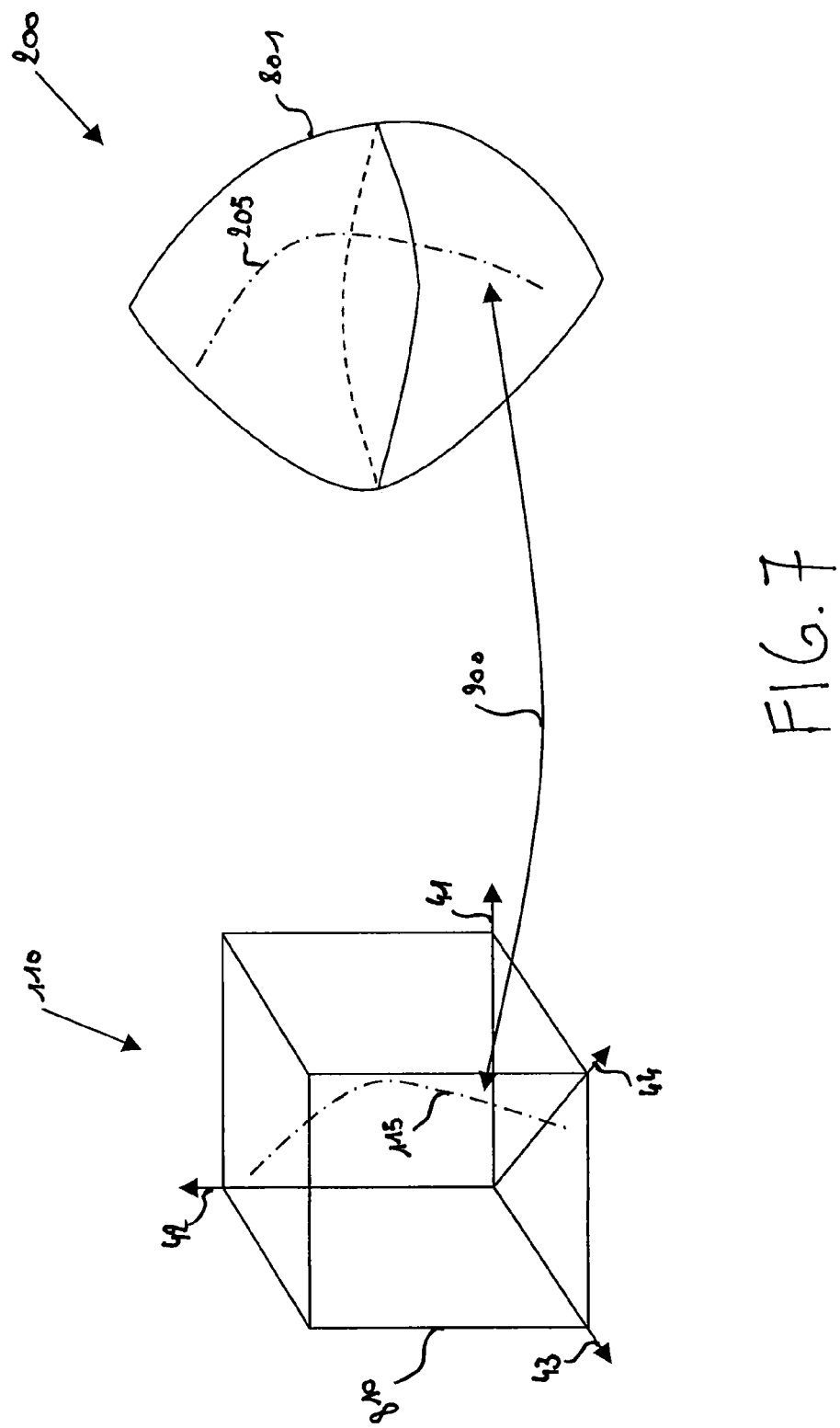
FIG. 7 shows a wanted behavior of a four-ink process with the colorants cyan, magenta, yellow and black: a continuous path 205 in color space 200 maps 900 to a continuous path 115 in colorant space 110.
Figure 8:
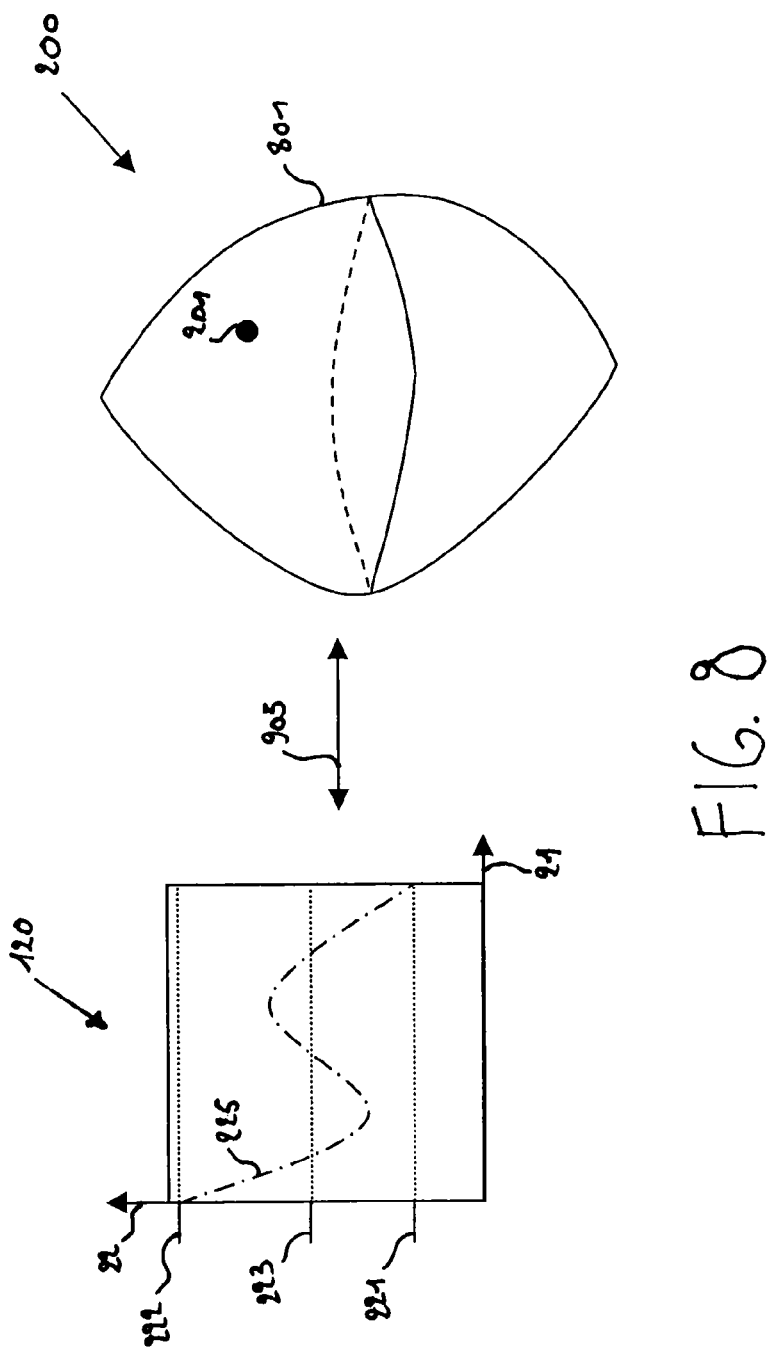
FIG. 8 shows a problem with a four-ink process with the colorants cyan, magenta, yellow and black: an in-gamut color 201 can be obtained with one path 225 in colorant space 120 but there is no unique relation between the path and K-values.
Figure 11:
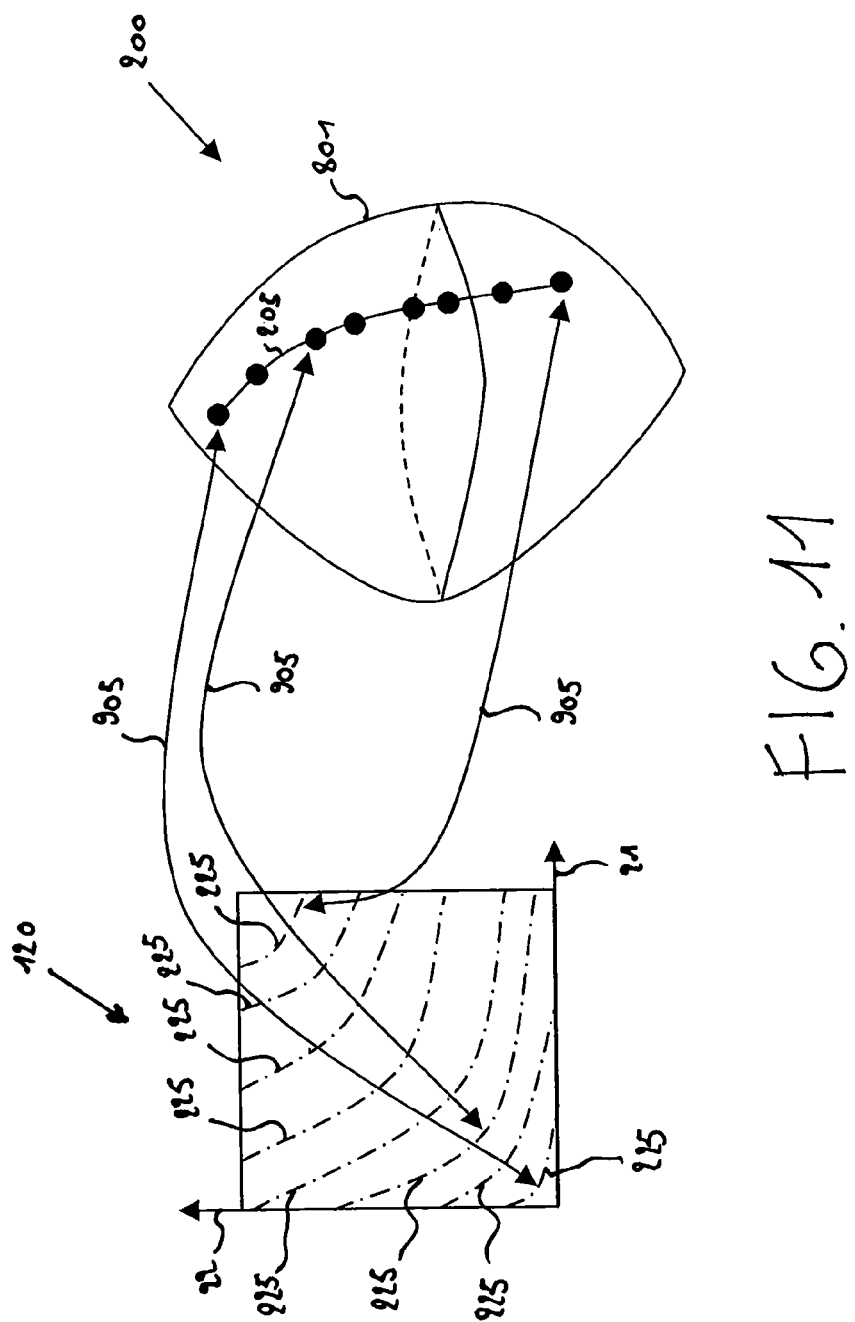
FIG. 11 shows a strictly monotonic regular four-ink process with the colorants cyan, magenta, yellow and black: a continuous path 205 in color space 200 can be obtained by monotonic decreasing paths 225 in colorant space 120 so the black values decrease and CMY values increase.

21: axis of the cyan, magenta and yellow colorant
22: axis of the black colorant
31: axis of the red colorant
32: axis of the green colorant
33: axis of the blue colorant
41: axis of the cyan colorant
42: axis of the black colorant
43: axis of the yellow colorant
44: axis of the magenta colorant
100: colorant space of a three-ink process with as colorants red, green and blue
101: colorant value inside the colorant cube
102: colorant value at the colorant boundary (RGB ink process)
103: colorant values that are mapped with color 203
104: colorant values that are mapped with color 204
105: a path in colorant space between 2 colorant values
112: colorant value at the colorant boundary (CMYK ink process)
115: a path in colorant space between 2 colorant values
120: colorant space presentation for a four-dimensional colorant space in two-dimensions
130: colorant space
141: axis for colorant 1
142: axis for colorant black
143: axis for colorant 2
144: boundary face
145: singular face
146: normal vector
147: normal vector
148: singular faces
150: colorant space of a two-dimensional colorant space with colorant 1 and colorant 2 as colorants
151: axis for colorant 1
152: axis for colorant 2
200: color space
201: in-gamut color
202: color value at the boundary of the color space
205: a path in color space between 2 colors
210: separation table in color space
221: minimum black value
222: maximum black value
223: multiple colorant combinations for the given black value
224: no colorant combinations for the given black value
225: path in colorant space of a color value
226: part of a path in colorant space of a color value
227: part of a path in colorant space of a color value
230: color space
240: separation table in color space
601: tetrahedron 1
602: tetrahedron 2
603: tetrahedron 3
604: tetrahedron 4
605: tetrahedron 5
606: tetrahedron 6
800: colorant cube for a three-dimensional colorant space 801: boundary of the color space
810: colorant cube in three-dimensions for a four-dimensional colorant space
820: colorant cube for a three-dimensional colorant space where black is one of the colorants
900: unique mapping between color values and colorant values
901: singular face
902: not a unique mapping between color values and colorant values
903: mapping between color values and colorant values for a CMYK ink process
905: mapping between color values and colorant values for a CMYK ink process
906: mapping to color space
1301: internal face
1302: boundary face
1350: three dimensional colorant cube
1351: cell
1500: path in colorant space (=R) that maps on color 1510
1501: path in colorant space (=S) that maps on color 1511
1502: path in colorant space (T) that maps on color 1512
1503: path in colorant space (=U) that maps on color 1513
1510: color value
1511: color value
1512: color value
1513: color value
1801: colorant combination
1810: splitting into simplices
2400: color value of white
2401: color value of black
2402: color value of colorant 1
2403: color value of colorant 2
2404: color value of the ink combination of colorant 1 and black
2405: color value of the ink combination of colorant 1 and black
2406: color value of the ink combination of colorant 1 and black and colorant 2
2407: color value of the ink combination of colorant 1 and colorant 2
6000: $P_{0,0,0}$
6001: $P_{0,0,1}$
6010: $P_{0,1,0}$
6011: $P_{0,1,1}$
6100: $P_{1,0,0}$
6101: $P_{1,0,1}$
6110: $P_{1,1,0}$
6111: $P_{1,1,1}$ Further advantages and embodiments of the present invention will become apparent from the following description.

DETAILED DESCRIPTION OF THE PREFERRED EMBODIMENTS

Piecewise-Linear Approximation of an n-Ink Model

Consider a colorant space $W^n$ with n colorants, $W^n = \{(c^1, \ldots, c^n) | 0 < c^1 < 100, \ldots, 0 < c^n < 100\}$, and a color space $R^3$ with dimension 3, $R^3 = \{(y^1, y^2, y^3) | -\infty < y^1 < +\infty, \ldots, -\infty < y^3 < +\infty\}$.

An n-ink model renders a combination of colorants $(c^1, \ldots, c^n)$ into the corresponding color values $(y^1, y^2, y^3)$. It means that an n-ink model can be described by the map F: $W^n \to R^3 | F(c^1, \ldots, c^n) = (y^1, y^2, y^3)$ with $W^n$ the colorant cube.

In practice the n-ink model is based on a printer target, that is printed and measured. The printer target comprises a number of color patches described by the finite set $\{w_i\} \subset W^n$, i.e., a mesh of fixed points $w_i$, i=1, ..., N, inside the colorant cube $W^n$. The corresponding measurements can be represented by the set $\{p_i\} \in R^3 = \{(y^1, y^2, y^3), -\infty < y^1, y^2, y^3 < \infty\}$; i.e. $F(w_i) = p_i$.

We call this mesh the measurement data of the n-ink model. Hence, a measurement data is a discrete map f: $\{w_i\} \to \{p_i\}$ such that $f(w_i) = p_i = F(w_i)$ for i=1, ..., N.

For simplicity, we restrict ourselves to the case of a regular grid defined in the colorant cube as follows: $W^n = [0, 100] \times \ldots \times [0, 100]$.

For k=1, ..., n consider the finite sets $Z^k = \{c^k_0, \ldots, c^k_{N(k)}\}$, $0 = c^k_0 < \ldots < c^k_{N(k)} = 100$, of N(k)+1 real numbers.

The product mesh $\{w_i\} = Z^1 \times \ldots \times Z^n \subset W^n$ of N points with $N = [N(1)+1][N(2)+1][N(3)+1] \ldots [N(n)+1]$ defines the regular grid in the colorant cube.

The most difficult problem in making color separation tables is the inversion of the n-ink model, i.e. to find a continuous map g: $F(W^n) \to W^n$, being the inverse map to F, i.e., the composition of the maps g and F is the identical map of the set $F(W^n)$, $F \circ g = Id_{F(W)}$.

Definition simplex: Suppose the colorant cube $W^n$ is decomposed into a union of K sets $\Delta_j$, $W^n = \cup_{j=1, \ldots, K} \Delta_j$ with the set $\Delta_j$, j=1, ..., K, an n-dimensional simplex. The intersection of any two simplices $\Delta_j$ and $\Delta_k$ is either empty, $\Delta_j \cap \Delta_k = \emptyset$, or is a boundary simplex (with dimension <n) of one of these simplices.

A simplex in a three-dimensional (resp. four-dimensional) space is called a tetrahedron (resp. pentahedron).

Definition Piecewise-Linear Map: A continuous map F: $W^n \to R^3$, is called piecewise-linear if there exists a simplex decomposition $W^n = \cup_{j=1, \ldots, K} \Delta_j$ of the n-dimensional colorant cube $W^n$ such that for all j the restriction $F|\Delta_j$: $\Delta_j \to R^3$ of the map F to simplex $\Delta_j$ is a linear map.

In other words, $F|\Delta_j(c) = a_j + B_j c$, where $c = (c^1, \ldots, c^n)^T$ is an n-dimensional vector of colorant values, $B_j$ is a 3×n matrix, and $a_j$ is a three-dimensional vector, $a_j \in R^3$, for j=1, ..., K.

If a non piecewise-linear n-ink model $F = (F^1(c), F^2(c), F^3(c))$ is approximated by a piecewise-linear n-ink model, the matrices $B_j$ are obtained by the Jacobian matrix of the non-piecewise linear model, i.e.

$$B_j^{kl} = \frac{\partial F^k}{\partial c^l}(c)$$

with k=1, 2, 3 the row and l=1, ..., n the column of the matrix $B_j$.

The vectors $a_j$ on the other hand are obtained from the evaluation of the non piecewise-linear n-ink model for a given set of colorant values, typically for one of the vertices of the simplex $\Delta_j$.

Definition non-degenerate piecewise-linear map: The piecewise-linear map F is called non-degenerate if the matrices $B_j$ are non-degenerate for all j=1, ..., K, i.e. $\det(B_j) \neq 0$.

Piecewise-Linear Three-Ink Model for a Three-Ink Color Device

Let a finite set $\{w_i\} \subset W^3$ of points $w_i$, i=1, ..., N, inside the colorant cube $W^3$ be a regular mesh. Consider a discrete map f: $\{w_i\} \to \{p_i\}$ of measurement data, where $p_i = f(w_i) = F(w_i)$ for i=1, ..., N.

To approximate the given discrete map f by a continuous map F: $W^3 \to R^3$, piecewise-linear interpolation is used. Here only tetrahedral interpolation is described, but similar results can be obtained by making use of other linear interpolation techniques, non-linear interpolation formulae or other models.

By definition of a regular mesh, for k=1, 2, 3 there exist the one-dimensional meshes $Z^k=\{c^k_0, \ldots, c^k_{N(k)}\}$, with $0=c^k_0<\ldots<c^k_{N(k)}=100$, of N(k)+1 real numbers such that $\{w_i\}=Z^1\times Z^2\times Z^3 \subset W^3$ and N=[N(1)+1][N(2)+1][N(3)+1].

It means that the three-dimensional colorant cube $W^3$ can be decomposed into the union $$W^3 = \bigcup_{i=1,\ldots,N(1), j=1,\ldots,N(2), k=1,\ldots,N(3)} \Pi_{i,j,k}$$

of the mesh parallelepiped cells $\Pi_{i,j,k}=[c^1_{i-1}, c^1_i]\times[c^2_{j-1}, c^2_j]\times[c^3_{k-1}, c^3_k]$, i=1, ..., N(1), j=1, ..., N(2), k=1, ..., N(3). Inside each of these parallelepiped cells the continuous approximation F of the measurement discrete map f is constructed in the following way:

Consider an arbitrary three-dimensional rectangular parallelepiped $\Pi=[0, 100]\times[0, 100]\times[0, 100]=\{(c^1, c^2, c^3), 0\leq c^1\leq 100, 0\leq c^2\leq 100, 0\leq c^3\leq 100\}$. There is an obvious one-to-one correspondence of the 8 vertices to the rectangular parallelepiped $\Pi$ and the 8 vertices (0,0,0), (0,0,1), (0,1,0), (0,1,1), (1,0,0), (1,0,1), (1,1,0), (1, 1, 1) to the unit three-dimensional cube $\Pi_1=\{(c^1, c^2, c^3), 0\leq c^1\leq 1, 0\leq c^2\leq 1, 0\leq c^3\leq 1\}$.

Numerate all the 8 vertices of the rectangular parallelepiped $\Pi$ by means of the corresponding vertices of the unit cube $\Pi_1$, $c_{000}$, $c_{001}$, $c_{010}$, $c_{011}$, $c_{100}$, $c_{101}$, $c_{110}$, $c_{111}$. Apply the same numeration to the values of the discrete map f, i.e., put $p_{ijk}=f(c_{ijk})$ for i, j, k=0, 1.

Define the map F inside the rectangular parallelepiped $\Pi$, $y^l=F^l(c^1,c^2,c^3)=p^l_{000}+r^l_1\Delta c^1+r^l_2\Delta c^2+r^l_3\Delta c^3$, where l=1, 2, 3, is the number of component of the map F in three-dimensional color space $R^3$ and $\Delta c^i=(c^i-c^i_0)/(c^i_1-c^i_0)$ for i=1, 2, 3. The coefficients $r^l_i$, i=1, 2, 3, are determined in correspondence with the following table:

| No | Conditions | $r^1_1$ | $r^1_2$ | $r^1_3$ |
|---|---|---|---|---|
| 1 | $\Delta c^1 \geq \Delta c^2 \geq \Delta c^3$ | $p^1_{100}-p^1_{000}$ | $p^1_{110}-p^1_{100}$ | $p^1_{111}-p^1_{110}$ |
| 2 | $\Delta c^1 \geq \Delta c^3 \geq \Delta c^2$ | $p^1_{100}-p^1_{000}$ | $p^1_{111}-p^1_{101}$ | $p^1_{101}-p^1_{100}$ |
| 3 | $\Delta c^3 \geq \Delta c^1 \geq \Delta c^2$ | $p^1_{101}-p^1_{001}$ | $p^1_{111}-p^1_{101}$ | $p^1_{001}-p^1_{000}$ |
| 4 | $\Delta c^2 \geq \Delta c^1 \geq \Delta c^3$ | $p^1_{110}-p^1_{010}$ | $p^1_{010}-p^1_{000}$ | $p^1_{111}-p^1_{110}$ |
| 5 | $\Delta c^2 \geq \Delta c^3 \geq \Delta c^1$ | $p^1_{111}-p^1_{011}$ | $p^1_{010}-p^1_{000}$ | $p^1_{011}-p^1_{010}$ |
| 6 | $\Delta c^3 \geq \Delta c^2 \geq \Delta c^1$ | $p^1_{111}-p^1_{011}$ | $p^1_{011}-p^1_{001}$ | $p^1_{001}-p^1_{000}$ |

Figure 12:
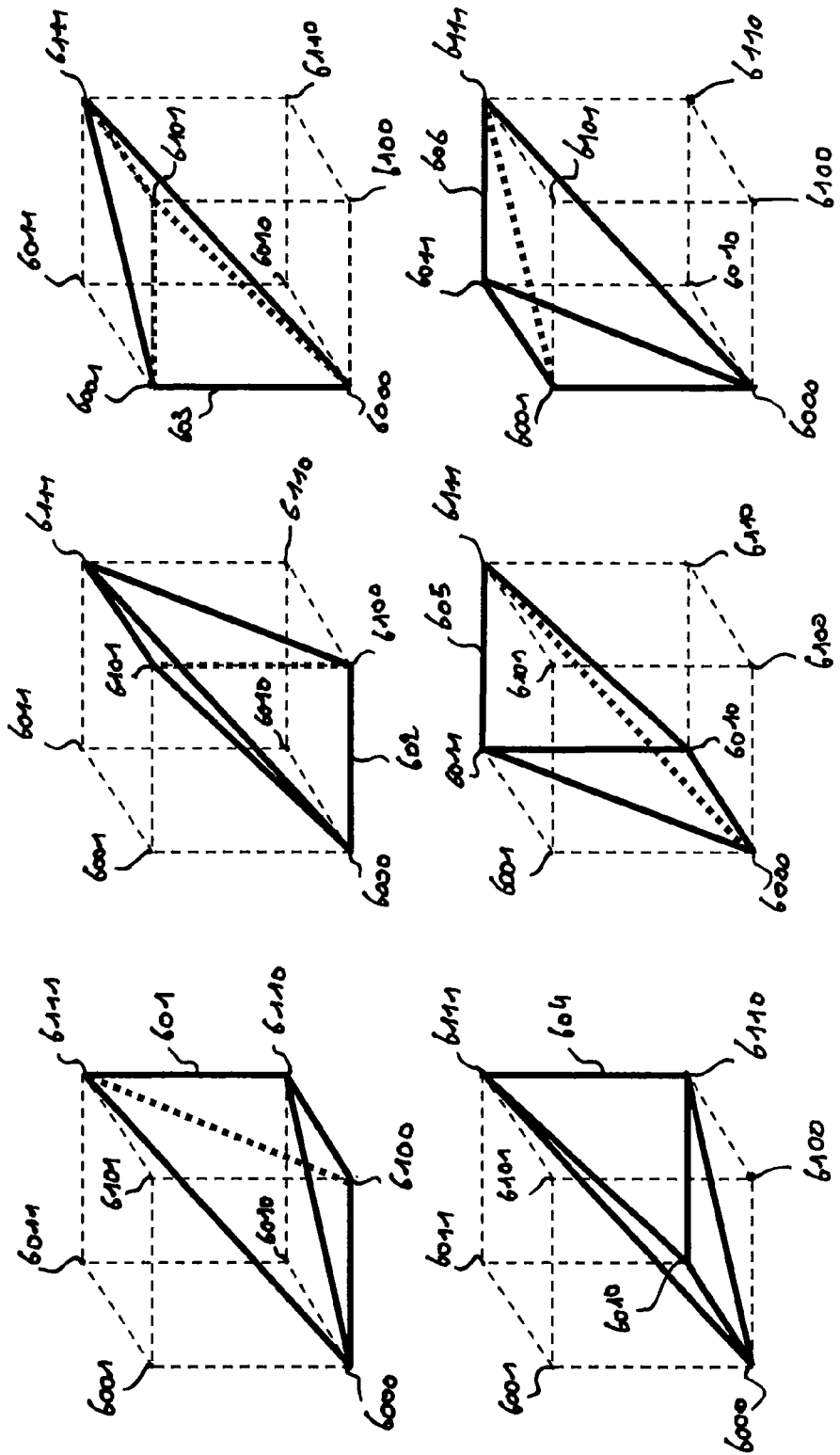
FIG. 12 shows a division of a three-dimensional cube into 6 tetrahedrons 601, 602, 603, 604, 605, 606.

The interpolation has a pure geometrical sense. We decompose a three-dimensional rectangular parallelepiped into six tetrahedrons (FIG. 12). These tetrahedrons are defined by the conditions in the second column of the table above. Inside each tetrahedron the map F is constructed by linear interpolation of the values $p_{ijk}$, i, j, k=0, 1, of the discrete map f at the vertices to the tetrahedrons.

Piecewise-Linear Four-Ink Model for a Four-Ink Color Device

Let a finite set $\{w_i\} \subset W^4$ of points $w_i$, i=1, ..., N, inside the colorant cube $W^4$ be a regular mesh. Consider a discrete map f: $\{w_i\}\to\{p_i\}$, of measurement data, where $p_i=f(w_i)=F(w_i)$, for i=1, ..., N.

To approximate the given discrete map f by a continuous map F: $W^4\to R^3$, piecewise-linear interpolation is used. Here only pentahedral interpolation is described, but similar results can be obtained by making use of other linear interpolation techniques, non-linear interpolation formulae or other models.

By definition of a regular mesh, for k=1, 2, 3, 4 there exist the one-dimensional meshes $Z^k=\{c^k_0, \ldots, c^k_{N(k)}\}$, $0=c^k_0<\ldots<c^k_{N(k)}=100$, of (N(k)+1) real numbers such that $\{w_i\}=Z^1\times Z^2\times Z^3\times Z^4 \subset W^4$ and N=[N(1)+1][N(2)+1][N(3)+1][N(4)+1].

It means that the four-dimensional colorant cube $W^4$ can be decomposed into the union $$W^4 = \bigcup_{\substack{i=1,\ldots,N(1), j=1,\ldots,N(2), k=1,\ldots,N(3), \\ l=1,\ldots,N(4)}} \Pi_{i,j,k,l}$$

of the mesh parallelepiped cells $\Pi_{i, j, k}=[c^1_{i-1}, c^1_i]\times[c^2_{j-1}, c^2_j]\times[c^3_{k-1}, c^3_k]\times[c^4_{k-1}, c^4_k]$, i=1, ..., N(1), j=1, ..., N(2), k=1, ..., N(3), l=1, ..., N(4). Inside each of these parallelepiped cells the continuous approximation F of the measurement discrete map f is constructed in the following way:

Consider an arbitrary four-dimensional rectangular parallelepiped $\Pi=[0, 100]\times[0, 100]\times[0, 100]\times[0, 100]=\{(c^1, c^2, c^3, c^3), 0\leq c^1\leq 100, 0\leq c^2\leq 100, 0\leq c^3\leq 100, 0\leq c^4\leq 100\}$. There is an obvious one-to-one correspondence of the 16 vertices to the rectangular parallelepiped $\Pi$ and the 16 vertices (0,0,0,0), (0,0,0,1), (0,0,1,0), (0,0,1,1), (0,1, 0,0), (0,1,0,1), (0,1,1,0), (0,1,1,1), (1,0,0,0), (1,0,0,1), (1,0,1,0), (1,0,1,1), (1,1,0,0), (1,1,0,1), (1,1,1,0), (1,1, 1,1) to the unit four-dimensional cube $\Pi_1=\{(c^1, c^2, c^3, c^4), 0\leq c^1\leq 1, 0\leq c^2\leq 1, 0\leq c^3\leq 1, 0\leq c^4\leq 1\}$.

Numerate all the 16 vertices of the rectangular parallelepiped $\Pi$ by means of the corresponding vertices of the unit cube $\Pi_1$, $c_{0000}$, $c_{0001}$, $c_{0010}$, $c_{0011}$, $c_{0100}$, $c_{0101}$, $c_{0110}$, $c_{0111}$, $c_{1000}$, $c_{1001}$, $c_{1010}$, $c_{1011}$, $c_{1100}$, $c_{1101}$, $c_{1110}$, $c_{1111}$.

Apply the same numeration to the values of the discrete map f, i.e., put $p_{ijkl}=f(c_{ijkl})$ for i, j, k, l=0, 1.

Define the map F inside the rectangular parallelepiped $\Pi$, $y^l=F^l(c^1, c^2, c^3, c^4)=p^l_{0000}+r^l_1\Delta c^1+r^l_2\Delta c^2+r^l_3\Delta c^3+r^l_4\Delta c^4$, where l=1, 2, 3, is the number of the component of the map F in three-dimensional color space $R^3$ and $\Delta c^i=(c^i-c^i_0)/(c^i_1-c^i_0)$ for i=1, 2, 3, 4. The coefficients $r^l_i$, i=1, 2, 3, 4, are determined in correspondence with the following table:

| No | Conditions | $r^1_1$ | $r^1_2$ | $r^1_3$ | $r^1_4$ |
|---|---|---|---|---|---|
| 1 | $\Delta c^1 \geq \Delta c^2 \geq \Delta c^3 \geq \Delta c^4$ | $p^1_{1000}-p^1_{0000}$ | $p^1_{1100}-p^1_{1000}$ | $p^1_{1110}-p^1_{1100}$ | $p^1_{1111}-p^1_{1110}$ |
| 2 | $\Delta c^1 \geq \Delta c^2 \geq \Delta c^4 \geq \Delta c^3$ | $p^1_{1000}-p^1_{0000}$ | $p^1_{1100}-p^1_{1000}$ | $p^1_{1111}-p^1_{1101}$ | $p^1_{1101}-p^1_{1100}$ |
| 3 | $\Delta c^1 \geq \Delta c^4 \geq \Delta c^2 \geq \Delta c^3$ | $p^1_{1000}-p^1_{0000}$ | $p^1_{1101}-p^1_{1001}$ | $p^1_{1111}-p^1_{1101}$ | $p^1_{1001}-p^1_{1000}$ |
| 4 | $\Delta c^4 \geq \Delta c^1 \geq \Delta c^2 \geq \Delta c^3$ | $p^1_{1001}-p^1_{0001}$ | $p^1_{1101}-p^1_{1001}$ | $p^1_{1111}-p^1_{1101}$ | $p^1_{0001}-p^1_{0000}$ |
| 5 | $\Delta c^1 \geq \Delta c^3 \geq \Delta c^2 \geq \Delta c^4$ | $p^1_{1000}-p^1_{0000}$ | $p^1_{1110}-p^1_{1010}$ | $p^1_{1010}-p^1_{1000}$ | $p^1_{1111}-p^1_{1110}$ |
| 6 | $\Delta c^1 \geq \Delta c^3 \geq \Delta c^4 \geq \Delta c^2$ | $p^1_{1000}-p^1_{0000}$ | $p^1_{1111}-p^1_{1011}$ | $p^1_{1010}-p^1_{1000}$ | $p^1_{1011}-p^1_{1010}$ |
| 7 | $\Delta c^1 \geq \Delta c^4 \geq \Delta c^3 \geq \Delta c^2$ | $p^1_{1000}-p^1_{0000}$ | $p^1_{1111}-p^1_{1011}$ | $p^1_{1011}-p^1_{1001}$ | $p^1_{1001}-p^1_{1000}$ |
| 8 | $\Delta c^4 \geq \Delta c^1 \geq \Delta c^3 \geq \Delta c^2$ | $p^1_{1001}-p^1_{0001}$ | $p^1_{1111}-p^1_{1011}$ | $p^1_{1011}-p^1_{1001}$ | $p^1_{0001}-p^1_{0000}$ |
| 9 | $\Delta c^3 \geq \Delta c^1 \geq \Delta c^2 \geq \Delta c^4$ | $p^1_{1010}-p^1_{0010}$ | $p^1_{1110}-p^1_{1010}$ | $p^1_{0010}-p^1_{0000}$ | $p^1_{1111}-p^1_{1110}$ |

-continued

| No | Conditions | $r^1_1$ | $r^1_2$ | $r^1_3$ | $r^1_4$ |
|---|---|---|---|---|---|
| 10 | $\Delta c^3 \geq \Delta c^1 \geq \Delta c^4 \geq \Delta c^2$ | $p^1_{1010}-p^1_{0010}$ | $p^1_{1111}-p^1_{1011}$ | $p^1_{0010}-p^1_{0000}$ | $p^1_{1011}-p^1_{1010}$ |
| 11 | $\Delta c^3 \geq \Delta c^4 \geq \Delta c^1 \geq \Delta c^2$ | $p^1_{1011}-p^1_{0011}$ | $p^1_{1111}-p^1_{1011}$ | $p^1_{0010}-p^1_{0000}$ | $p^1_{0011}-p^1_{0010}$ |
| 12 | $\Delta c^4 \geq \Delta c^3 \geq \Delta c^1 \geq \Delta c^2$ | $p^1_{1011}-p^1_{0011}$ | $p^1_{1111}-p^1_{1011}$ | $p^1_{0011}-p^1_{0001}$ | $p^1_{0001}-p^1_{0000}$ |
| 13 | $\Delta c^2 \geq \Delta c^1 \geq \Delta c^3 \geq \Delta c^4$ | $p^1_{1100}-p^1_{0100}$ | $p^1_{0100}-p^1_{0000}$ | $p^1_{1110}-p^1_{1100}$ | $p^1_{1111}-p^1_{1110}$ |
| 14 | $\Delta c^2 \geq \Delta c^1 \geq \Delta c^4 \geq \Delta c^3$ | $p^1_{1100}-p^1_{0100}$ | $p^1_{0100}-p^1_{0000}$ | $p^1_{1111}-p^1_{1101}$ | $p^1_{1101}-p^1_{1100}$ |
| 15 | $\Delta c^2 \geq \Delta c^4 \geq \Delta c^1 \geq \Delta c^3$ | $p^1_{1101}-p^1_{0101}$ | $p^1_{0100}-p^1_{0000}$ | $p^1_{1111}-p^1_{1101}$ | $p^1_{0101}-p^1_{0100}$ |
| 16 | $\Delta c^4 \geq \Delta c^2 \geq \Delta c^1 \geq \Delta c^3$ | $p^1_{1101}-p^1_{0101}$ | $p^1_{0101}-p^1_{0001}$ | $p^1_{1111}-p^1_{1101}$ | $p^1_{0001}-p^1_{0000}$ |
| 17 | $\Delta c^2 \geq \Delta c^3 \geq \Delta c^1 \geq \Delta c^4$ | $p^1_{1110}-p^1_{0110}$ | $p^1_{0100}-p^1_{0000}$ | $p^1_{0110}-p^1_{0100}$ | $p^1_{1111}-p^1_{1110}$ |
| 18 | $\Delta c^2 \geq \Delta c^3 \geq \Delta c^4 \geq \Delta c^1$ | $p^1_{1111}-p^1_{0111}$ | $p^1_{0100}-p^1_{0000}$ | $p^1_{0110}-p^1_{0100}$ | $p^1_{0111}-p^1_{0110}$ |
| 19 | $\Delta c^2 \geq \Delta c^4 \geq \Delta c^3 \geq \Delta c^1$ | $p^1_{1111}-p^1_{0111}$ | $p^1_{0100}-p^1_{0000}$ | $p^1_{0111}-p^1_{0101}$ | $p^1_{0101}-p^1_{0100}$ |
| 20 | $\Delta c^4 \geq \Delta c^2 \geq \Delta c^3 \geq \Delta c^1$ | $p^1_{1111}-p^1_{0111}$ | $p^1_{0101}-p^1_{0001}$ | $p^1_{0111}-p^1_{0101}$ | $p^1_{0001}-p^1_{0000}$ |
| 21 | $\Delta c^3 \geq \Delta c^2 \geq \Delta c^1 \geq \Delta c^4$ | $p^1_{1110}-p^1_{0110}$ | $p^1_{0110}-p^1_{0010}$ | $p^1_{0010}-p^1_{0000}$ | $p^1_{1111}-p^1_{1110}$ |
| 22 | $\Delta c^3 \geq \Delta c^2 \geq \Delta c^4 \geq \Delta c^1$ | $p^1_{1111}-p^1_{0111}$ | $p^1_{0110}-p^1_{0010}$ | $p^1_{0010}-p^1_{0000}$ | $p^1_{0111}-p^1_{0110}$ |
| 23 | $\Delta c^3 \geq \Delta c^4 \geq \Delta c^2 \geq \Delta c^1$ | $p^1_{1111}-p^1_{0111}$ | $p^1_{0111}-p^1_{0011}$ | $p^1_{0010}-p^1_{0000}$ | $p^1_{0011}-p^1_{0010}$ |
| 24 | $\Delta c^4 \geq \Delta c^3 \geq \Delta c^2 \geq \Delta c^1$ | $p^1_{1111}-p^1_{0111}$ | $p^1_{0111}-p^1_{0011}$ | $p^1_{0011}-p^1_{0001}$ | $p^1_{0001}-p^1_{0000}$ |

Also in this case the interpolation has a pure geometrical sense. We decompose a four-dimensional rectangular parallelepiped into 24 pentahedrons. These pentahedrons are defined by the conditions in the second column of the table above. Inside each tetrahedron the map F is constructed by linear interpolation of the values $p_{ijkl}$, i, j, k, l=0,1, of the discrete map f at the vertices to the pentahedrons.

Gamut Description of a Three-Ink Model

Consider a piecewise-linear three-ink model F: $W^3 \to R^3$ of a given three-ink color device. From a mathematical point of view, the gamut of the three-ink model is represented as the image $F(W^3)$ of the piecewise-linear map F.

By definition of a piecewise-linear map F, we have the simplex decomposition of the three-dimensional colorant cube $W^3$ into the union of N tetrahedrons $\Delta_j$, $W^3 = \cup_{j=1,\ldots,N} \Delta_j$.

Each tetrahedron has four two-dimensional faces. These faces are triangles and each triangle either belongs to one or several tetrahedrons of the set $\{\Delta_j\}$.

Definition Boundary Face:

Fix a tetrahedron $\Delta_l$, l=1, ..., N, and consider a two-dimensional boundary triangle $\delta$ of $\Delta_l$. The face $\delta$ is called a boundary face of the colorant cube if it does not belong to any other tetrahedron of the set $\{\Delta_j\}$, i.e., $\delta \not\subset \Delta_k$ for k=1, ..., l-1, l+1, ..., N (FIG. 13).

Definition Internal Face:

The face $\delta$ is called internal if their exists a tetrahedron $\Delta_k$ from the set $\{\Delta_j\}_{such\ that}$ $\delta$ belongs to both $\Delta_l$ and $\Delta_k$, i.e., $\delta \subseteq \Delta_l \cap \Delta_k$ (FIG. 13).

Denote the set of all the boundary faces of the colorant cube $W^3$ by $\Theta$.

The set $\Theta$ of all the boundary faces is independent of the three-ink model. The union of all these faces always coincides with the boundary $\partial W^3$ of the three-dimensional colorant cube, $\cup_{\delta \in \Theta} \delta = \partial W^3$. These boundaries are also called physical boundaries in patent application EP 0 763 927.

Suppose the three-ink model under consideration is non-degenerate, i.e., the corresponding piecewise-linear map F is non-degenerate. By definition, it means that all the restrictions $F|\Delta_j : \Delta_j \to R^3$, of the map F to tetrahedrons $\Delta_j$ are non-degenerate linear maps $F|\Delta_j(c) = a_j + B_j c$.

In other words, the determinant of the corresponding matrix $B_j$ is either positive, i.e. det $B_j > 0$, or negative, i.e. det $B_j < 0$.

Figure 14:
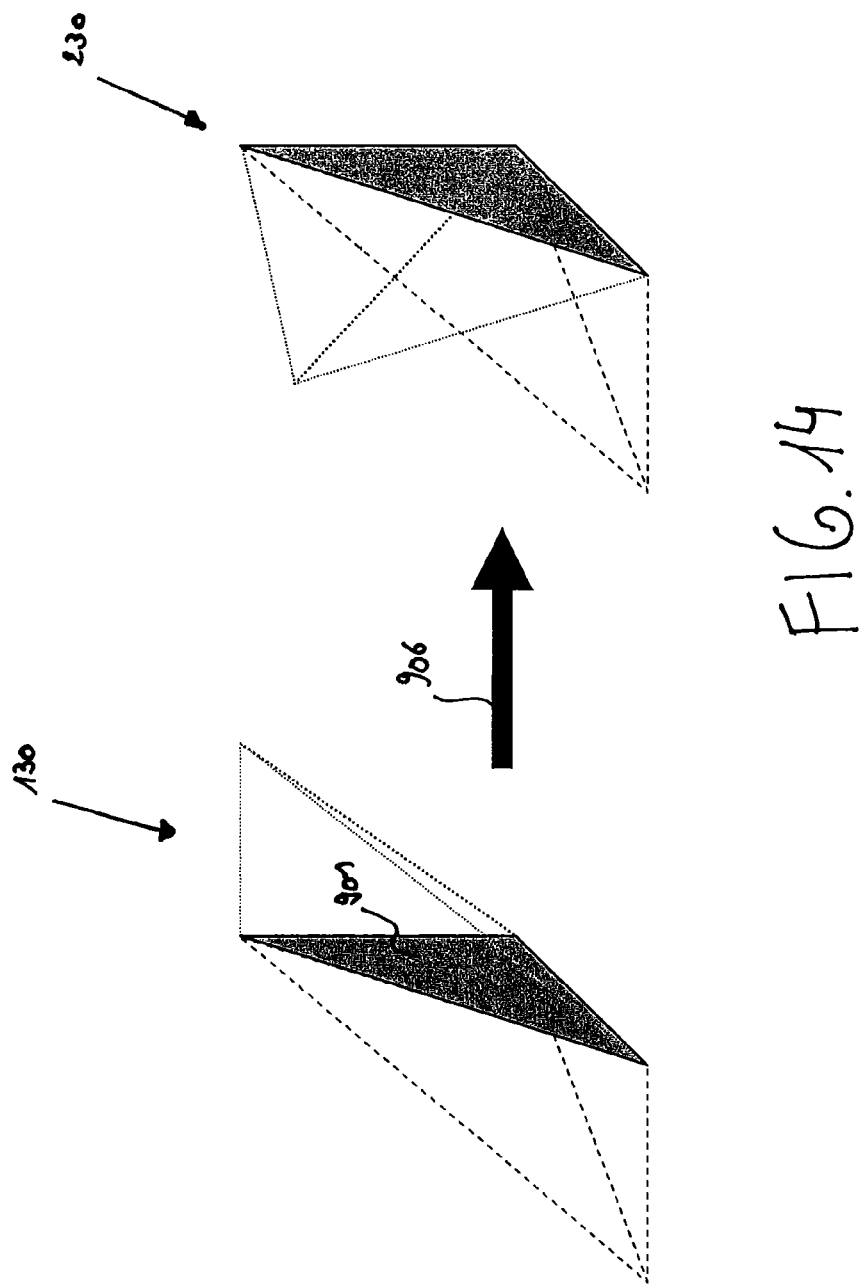
FIG. 14 shows a singular face 901 for a three-dimensional colorant space 130 and its mapping to the color space 230.

Definition Singular Face:

Fix a tetrahedron $\Delta_l$, l=1, ..., N, and consider a two-dimensional internal face, a triangle $\delta$. The internal face $\delta$ is called singular if there exists a tetrahedron $\Delta_k$ from the set $\{\Delta_j\}$ such that $\delta$ belongs to both $\Delta_l$ and $\Delta_k$, $\delta \subseteq \Delta_l \cap \Delta_k$, and the determinants of the corresponding matrices $B_l$ and $B_k$ have different signs, i.e., either (det $B_l > 0$ and det $B_k < 0$) or (det $B_l < 0$ and det $B_k > 0$) (FIG. 14).

Denote the set of all the singular faces of the given three-ink model by $\Sigma$.

In contrast to the set $\Theta$ of all the boundary faces, the set $\Sigma$ of all the singular faces essentially depends on the choice of the three-ink model, i.e., on the choice of the corresponding piecewise-linear map F. For example, for some three-ink models this set is empty and for some it is not. These faces of set $\Sigma$ are also called natural boundaries in patent application EP 0 763 927.

It is possible to describe the gamut of a non-degenerate three-ink model in terms of boundary and singular faces. The following theorem can be proven:

Theorem 1: For any non-degenerate three-ink model the boundary of the gamut is a subset of the images of all the boundary and singular faces, i.e. $\partial F(W^3) \subseteq F(\Theta) \cup F(\Sigma)$.

In reality, these boundary and singular faces not always constitute a nicely closed surface. If singular faces are present, some boundary and singular faces intersect and hence the gamut boundary can be obtained by taking the outer boundary of all boundary and singular faces. If no singular faces are present, theoretically it is still possible that the boundary faces intersect. Hence in this case the gamut is obtained by taking the outer boundary of all boundary faces. However, if no singular faces are present and the boundary faces do not intersect, the gamut is defined by all the boundary faces, which all together define the gamut boundary (no outer boundary to be taken).

Gamut Description of a Four-Ink Model

Consider a piecewise-linear four-ink model F: $W^4 \to R^3$, of a four-ink color device.

Definition Proper Four-Ink Model:

If the image of the boundary $\partial W^4$ of the four-dimensional colorant cube coincides with the image of the whole cube $W^4$, i.e., $F(W^4) = F(\partial W^4)$, then the four-ink model is called proper.

In this section the gamut of a proper non-degenerate four-ink model is described, i.e., the image $F(W^4)$ of the corresponding piecewise-linear map F in color space.

By definition of a piecewise-linear map, we have the simplex decomposition of the four-dimensional colorant cube $W^4$ into the union of N, N>0, simplices $\Delta_j$, $W^4 = \cup_{j=1,\ldots,N} \Delta_j$.

Each pentahedron has five three-dimensional faces. These faces are tetrahedrons and each tetrahedron either belongs to one or several pentahedrons of the set $\{\Delta_j\}$.

Definition Boundary Face:

Fix a pentahedron $\Delta_l$, $l=1, \ldots, N$, and consider a three-dimensional boundary tetrahedron $\delta$ of $\Delta_l$. The face $\delta$ is called a boundary face of the colorant cube if it does not belong to any other pentahedron of the set $\{\Delta_j\}$, i.e., $\delta \not\subset \Delta_k$ for $k=1, \ldots, l-1, l+1, \ldots, N$.

Denote the set of all the boundary faces of the colorant cube $W^4$ by $\Theta$.

The set $\Theta$ of all the boundary faces does not depend on the choice of the four-ink model, i.e., on the choice of the corresponding piecewise-linear map F. The union of all these faces always coincides with the boundary $\partial W^4$ of the four-dimensional colorant cube, $\cup_{\delta \in \Theta} \delta = \partial W^4$. These boundary faces are also obtained by the eight boundary three-ink models of the four-ink model.

By definition of the piecewise-linear map F, all the restrictions $F|\Delta_j : \Delta_j \to R^3$, of the map F to pentahedrons $\Delta_j$ are linear maps, i.e., $F|\Delta_j(c) = a_j + B_j c$, where $B_j$ is a 3×4 matrix for $j=1, \ldots, N$.

Let $B_j^i$ be the 3×3 matrix obtained by omitting the i-th column of the 3×4 matrix $B_j$ and let $\chi_j = (\det B_j^1, -\det B_j^2, \det B_j^3, -\det B_j^4)$ for $j=1, \ldots, N$.

Definition Characteristic Vector Field:

Consider the four-ink model corresponding to the piecewise-linear map F. The vector field $\chi$ on the colorant cube $W^4$ such that $\chi|\Delta_j = \chi_j$ for $j=1, \ldots, N$ is called the characteristic vector field of the four-ink model.

Figure 15:
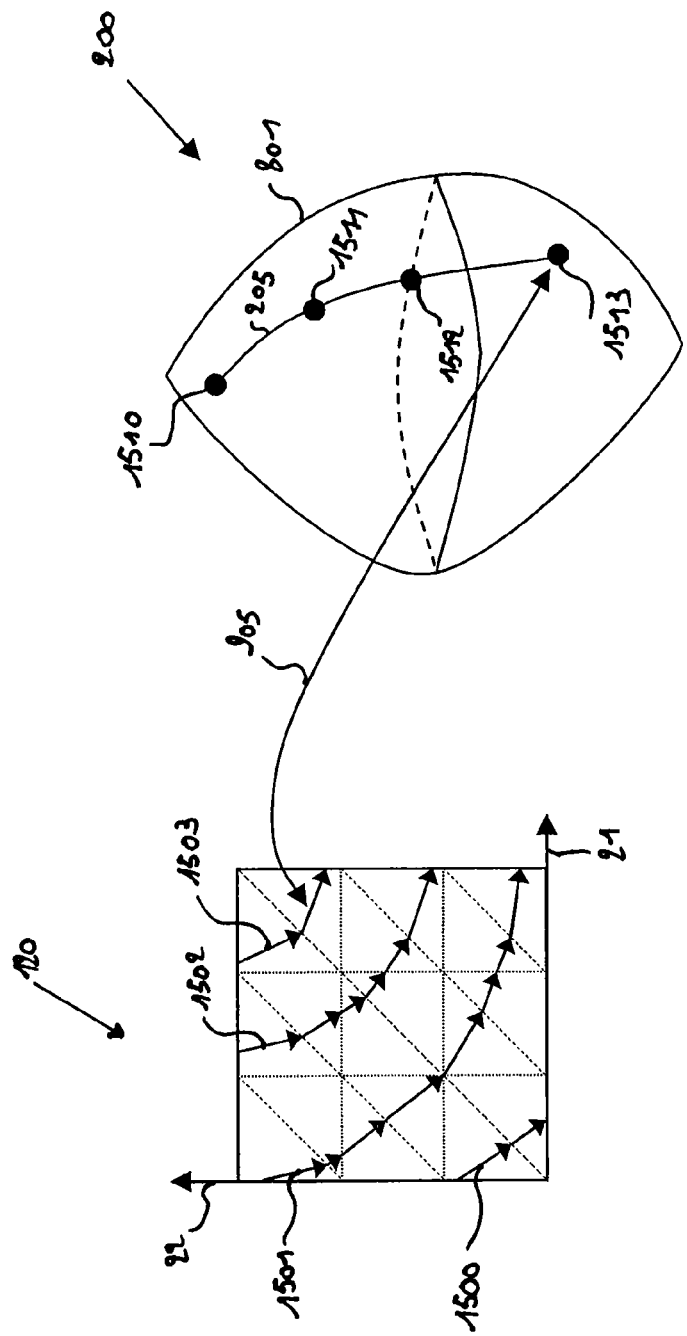
FIG. 15 shows the characteristic vector field in a four-colorant space 120 with the colorants cyan, magenta, yellow and black where per simplex the vector field is constant and is tangent to the path in colorant space mapping to the same color in color space 200.

By definition, the characteristic vector field of any four-ink model is a four-dimensional piecewise-constant vector field on the four-dimensional colorant cube $W^4$, as it is defined for a piecewise-linear four-ink model. As a result, per pentahedron $\Delta_j$, with $j=1, \ldots, N$, the vector field is constant and equal to the matrix $B_j$. The geometrical meaning of the vector $\chi_j$ itself can be expressed as follows: all colors along a line within the pentahedron $\Delta_j$ with direction defined by this vector $\chi_j$ map to the same color in color space. Hence the characteristic vector field is the derivative along the one-dimensional path in colorant space of which all colorant combinations map to the same color. Colorant combinations at the boundary of multiple pentahedrons in general have multiple derivatives. The four-ink model is non-degenerate if and only if the corresponding characteristic vector field $\chi$ is non-degenerate, i.e., $\chi_j \neq 0$ for all $j=1, \ldots, N$ (FIG. 15).

Hence, the concept of characteristic vector field can be extended for non piecewise-linear four-ink models as follows: assume that all colorant combinations that map to a given color in colorant space lie along a one-dimensional path in colorant space. The derivative along this path is defined as the characteristic vector field. This derivative $\chi$ is obtained as follows: calculate the Jacobian matrix for a given colorant combination, i.e. a 3×4 matrix $B_j$, and set $\chi = (\det B_j^1, -\det B_j^2, \det B_j^3, -\det B_j^4)$.

On the boundary $\partial W^4$ of the four-dimensional colorant cube $W^4$ there exists the normal vector field $v$ to this cube. Let $\delta_j$, $j=1, \ldots, N$, be a boundary face of the four-dimensional colorant cube $W^4$ belonging to the pentahedron $\Delta_j$. Denote by $v_j$ the restriction of the normal vector field $v$ to this face, i.e., $v_j = v|\delta_j$.

Let $\delta_k$ and $\delta_l$ be boundary faces of the four-dimensional colorant cube $W^4$ such that $\delta_k \subset \Delta_k$ and $\delta_l \subset \Delta_l$ for some pentahedrons $\Delta_k$ and $\Delta_l$, $k, l=1, \ldots, N$. By definition, these boundary faces are tetrahedrons. Suppose they have a two-dimensional face, a triangle $\delta$, in common, $\delta = \delta_k \cap \delta_l$.

Definition Singular Face:

The two-dimensional face $\delta$ is a singular face of a non-degenerate four-ink model corresponding to the piecewise-linear map F if the inner products $(v_k, \chi_k)$ and $(v_l, \chi_l)$ of the normal vector field $v$ and the characteristic vector field $\chi$ have different signs, i.e., either $((v_k, \chi_k) > 0$ and $(v_l, \chi_l) < 0)$ or $((v_k, \chi_k) < 0$ and $(v_l, \chi_l) > 0)$.

Denote the set of all the singular faces of the given four-ink model by $\Sigma$.

On the contrary to the set $\Theta$ of all the boundary faces, the set $\Theta$ of all the singular faces essentially depends on the choice of the four-ink model, i.e., on the choice of the corresponding piecewise-linear map F. Moreover, a boundary face is a three-dimensional simplex, i.e. a tetrahedron, whereas a singular face is a two-dimensional simplex, i.e. a triangle.

For some three-ink model the set $\Sigma$ of all the singular faces can be empty. For any four-ink model the set $\Sigma$ of all the singular faces is not empty and it is possible to describe the gamut of a proper non-degenerate four-ink model in terms of singular faces only. The following theorem holds:

Theorem 2: For any proper non-degenerate four-ink model the boundary of the gamut is a subset of the images of all the singular faces, i.e., $\delta F(W^4) \subseteq F(\Sigma)$.

The concept of a singular face is shown in FIG. 16, that represents the mapping from a three-ink model $c^1 c^2 K$ to a two-dimensional color space with a global ink exchange (definition "global ink exchange" see section "Regular three-ink models") between $c^1 c^2$ and K.

Also for four-ink models, the singular faces may intersect and hence in general the gamut of a proper non-degenerate four-ink model is obtained by taking the outer boundary of all singular faces.

Regular Three-Ink Models

Consider a piecewise-linear three-ink model $F: W^3 \to R^3$ of a three-ink color device.

Definition regular three-ink model: The three-ink model is called regular if the piecewise-linear map F is an injection.

Lemma: Let a topological space W be compact and a map F, $F: W \to F(W)$, be a continuous injection. Then there exists the unique continuous inverse map $g = F^{-1}: F(W) \to W$. In other words, then the map F is a homeomorphism.

Since the three-dimensional cube $W^3$ is a compact topological space the lemma under consideration gives a satisfactory approach to construction of solutions to the inverse problem of modeling of regular three-ink models.

By definition of a piecewise-linear map, we have the simplex decomposition of the three-dimensional colorant cube $W^3$ into the set of N tetrahedrons $\Delta_j$, $W^3 = \cup_{j=1, \ldots, N} \Delta_j$, such that all the restrictions $F|\Delta_j : \Delta_j \to R^3$, of the map F to tetrahedrons $\Delta_j$ are linear maps, i.e., $F|\Delta_j(c) = a_j + B_j c$, where $B_j$ is a 3×3 matrix, c and $a_j$ are three-dimensional vectors for $j=1, \ldots, N$.

Definition Strictly Non-Degenerate Three-Ink Model:

A three-ink model is called strictly non-degenerate if all the determinants of the matrices $B_j$ are of the same sign, i.e., either $\det B_j > 0$ for all the indices $j=1, \ldots, N$, or $\det B_j < 0$ for all the indices $j=1, \ldots, N$.

Any strictly non-degenerate three-ink model is non-degenerate. The inverse statement is false. By definition of a singular face, a three-ink model is strictly non-degenerate if and only if the set $\Sigma$ of all its singular faces is empty, $\Sigma = \emptyset$.

There is an effective criterion of a three-ink model to be regular.

Theorem 3: Let $F: W^3 \to R^3$ be a piecewise-linear model of a three-ink model. This three-ink model is regular if and only if it is strictly non-degenerate and the restriction $F|\partial W^3: \partial W^3 \to R^3$ of the map F to the boundary of the three-dimensional colorant cube $W^3$ is an injection.

As a consequence, the gamut of a regular three-ink model is defined by the boundary faces. These faces constitute a closed oriented surface with Euler number equal to 2 (no outer boundary to be taken).

Regular Four-Ink Model

Consider a piecewise-linear four-ink model F: $W^4 \to R^3$ of a four-ink color device.

Definition Regular Four-Ink Model:

The four-ink model is called regular if the following three properties hold for the piecewise-linear map F:

The gamut $F(W^4)$ is homeomorphic to the closed three-dimensional disk $D^3$.

For any internal point p of the gamut $F(W^4)$, p∈int $F(W^4)$, the preimage $F^{-1}(p)$ is homeomorphic to a segment [0, 100], and the intersection of this preimage and the boundary $\partial W^4$ of the colorant cube $W^4$, $F^{-1}(p) \cap \partial W^4$, consists exactly of the two boundary points to the preimage $F^{-1}(p)$.

For any boundary point p of the gamut $F(W^4)$, p∈$\partial F(W^4)$, the preimage $F^{-1}(p)$ consists exactly of one point.

If a four-ink model is regular then it is non-degenerate and proper. Of course, the inverse statement is false.

Let $\chi$ be the characteristic vector field of the four-ink model under consideration. By definition, it is a piecewise-constant vector field such that $\chi|\Delta_j = \chi_j$, where $\chi_j = (\det B_j^1, -\det B_j^2, \det B_j^3, -\det B_j^4)$ for $j=1, \ldots, N$.

Definition Strictly Non-Degenerate Four-Ink Model:

A four-ink model is called strictly non-degenerate if it is non-degenerate and at any point c of the four-dimensional colorant cube $W^4$ each of the four coordinates of the characteristic vector field $\chi$ has the same sign. In other words, for all $j=2, \ldots, N$ the i-th coordinate $\chi_j^i = (-1)^{i+1} \det B_j^i$ of the characteristic vector field $\chi$ at j-th simplex has the same sign as the i-th coordinate $\chi_1^i = (-1)^{i+1} \det B_1^i$ of the characteristic vector field $\chi$ at the first simplex for i=1, 2, 3, 4.

It is possible to show that for a strictly non-degenerate four-ink model the set of singular faces $\Sigma$ only consists of two-dimensional faces of the colorant cube $W^4$. These two-dimensional faces are obtained by the intersection of two physical ink limitations of the colorant cube, e.g.

$C^i$=minimum and $C^j$=minimum=>6 two-ink planes
$C^i$=minimum and $C^j$=maximum=>12 two-ink planes
$C^i$=maximum and $C^j$=maximum=>6 two-ink planes
with i≠j and i,j=1, 2, 3, 4.

These are the 24 two-dimensional faces of the three-dimensional faces of the colorant cube. Hence, the set of all the singular faces of a strictly non-degenerate four-ink model is homeomorphic to the two-dimensional sphere $S^2$.

The sign characteristic of the vector field is also referred to as the global ink exchange. For a conventional CMYK four-ink model, the sign characteristic is + for CMY and − for K (or vice versa), so we say that CMY exchanges for K. Practically, this means that for an in-gamut color, the color is retained if all CMY values increase (resp. decrease) and K decrease (resp. increase). For a four-ink model there are 7 different possibilities for a global ink exchange, i.e.

A. $c^1, c^2, c^3 \Leftrightarrow c^4$
B. $c^1, c^2, c^4 \Leftrightarrow c^3$
C. $c^1, c^3, c^4 \Leftrightarrow c^2$
D. $c^2, c^3, c^4 \Leftrightarrow c^1$
E. $c^1, c^2 \Leftrightarrow c^3, c^4$
F. $c^1, c^3 \Leftrightarrow c^2, c^4$
G. $c^1, c^4 \Leftrightarrow c^2, c^3$ The 2-ink boundary faces $c^i c^j$ that define the gamut for the different exchanges types are represented in the table below:

| | $c^i, c^j = 0$ | $c^i = 0, c^j = 1$ | $c^i = 1, c^j = 0$ | $c^i, c^j = 1$ |
|---|---|---|---|---|
| $c^1, c^2$ | A B F G | C D E | C D E | A B F G |
| $c^1, c^3$ | A C E G | B D F | B D F | A C E G |
| $c^1, c^4$ | B C E F | A D G | A D G | B C E F |
| $c^2, c^3$ | A D E F | B C G | B C G | A D E F |
| $c^2, c^4$ | B D E G | A C F | A C F | B D E G |
| $c^3, c^4$ | C D F G | A B E | A B E | C D G F |

This table is interpreted as follows: $c^1 = c^2 = 0$ is a boundary face for the cases, A, B, F and G. And $c^1 = 0$, $c^2 = 1$ is a boundary face for the cases, C, D and E. Here it is indicated that 12 of the 24 2-dimensional boundary faces define the gamut, i.e. a closed oriented surface with Euler number 2.

There is a sufficient condition for a four-ink model to be regular.

Theorem 4: If a four-ink model is strictly non-degenerate and the restriction $F|\Sigma$ of the piecewise-linear map F to the set $\Sigma$ of all its singular faces is an injection, then this four-ink model is regular.

In FIG. 17 a number of characteristics are shown for a regular three-ink model $c^1 c^2 K$ to a two-dimensional color space with a global ink exchange between $c^1 c^2$ and K. The mapping of the three-dimensional colorant space to the two-dimensional color space can be seen as a projective transformation of a deformed colorant cube onto the two-dimensional color space. For a regular four-ink model the singular faces, which are line segments in this example, divide the boundary of the colorant cube into two parts. The meaning of this division can be illustrated as follows: for every in-gamut color there is a path in colorant space that starts and ends at the boundary of the colorant cube. For every path, the starting point is always located in one part whereas the end point is always found in the other part. Colors at the gamut boundary can only be obtained with one set of colorant values. Here it is also obvious that the gamut boundary is obtained by the intersection of two physical ink limitations, for a regular model from a three-dimensional to a two-dimensional color space the gamut boundary is defined by 6 intersections of two ink limitations.

Regularization of a Three-Ink Model

Consider a piecewise-linear three-ink model F: $W^3 \to R^3$ of a three-ink color device. By definition of a piecewise-linear map we have the simplex decomposition of the three-dimensional colorant cube $W^3$ into the set of N, N>0, tetrahedrons $\Delta_j$, $W = \cup_{j=1, \ldots, N} \Delta_j$, such that all the restrictions $F|\Delta_j: \Delta_j \to R^3$, of the map F to tetrahedrons $\Delta_j$ are linear maps, i.e., $F|\Delta_j(c) = a_j + B_j c$, where $B_j$ is a 3×3 matrix, and $a_j$ is a three-dimensional vector for $j=1, \ldots, N$. Based on theorem 3, this three-ink model is regular if all the determinants of the matrices $B_j$ have the same sign. In other words, either det $B_j > 0$ for all the indices $j=1, \ldots, N$, or (exclusive) det $B_j < 0$ for all the indices $j=1, \ldots, N$. An algorithm forcing a three-ink model to be strictly non-degenerate can be implemented as follows:

At the first step count the number $n_{pos}$ of positive determinants and the number $n_{neg}$ of negative determinants. Assume that $n_{pos} > n_{neg}$ At the second step define a positive threshold $\epsilon$, $\epsilon > 0$, usually a small real number, and construct an error functional R, $R = R(p_1, \ldots, p_M) = \Sigma_{j=1, \ldots, N} R_j(p_1, \ldots, p_M)$, where $R_j = R_j(p_1, \ldots, p_M) = 0$ if det $B_j \geq \epsilon$ and $R_j = R_j(p_1, \ldots, p_M) = (\epsilon - \det B_j)^2$ if det $B_j < \epsilon$ for $j=1, \ldots, N$. Here $p_1, \ldots, p_M$ are the three-dimensional points in color space, forming the measurement data of the three-ink model. By construction of the piecewise-linear map F, all the determinants det $B_j$ are third order polynomials with respect to measurement data $p_1, \ldots, p_M$ for $j=1, \ldots, N$. Hence, all the functions $R_j$ for $j=1, \ldots, N$ and the error functional $R=R(p_1, \ldots, p_M)$ are smooth with respect to the measurement data $p_1, \ldots, p_M$.

If $n_{pos} < n_{neg}$, at the second step define a positive threshold $\epsilon$, $\epsilon > 0$, usually a small real number, and construct an error functional R, $R=R(p_1, \ldots, p_M)=\Sigma_{j=1, \ldots, N} R_j(p_1, \ldots, p_M)$, where $R_j=R_j(p_1, \ldots, p_M)=0$ if $\det B_j \leq -\epsilon$ and $R_j=R_j(p_1, \ldots, p_M)=(\epsilon + \det B_j)^2$ if $\det B_j > -\epsilon$ for $j=1, \ldots, N$.

At the third step minimize the error functional R with respect to measurement data $p_1, \ldots, p_M$, $R(p_1, \ldots, p_M) \rightarrow$ min by making use of an minimum optimizing algorithm and preferably a gradient method (see Numerical recipes in C, The art of scientific computing, second edition, W. H. Kress et al., Cambridge University Press, 1992), herein incorporated by reference in its entirety. A gradient method in optimizing techniques is an algorithm to solve problems of the form $$\min_{x \in R^n} f(x)$$

with the search directions defined by the gradient of the function at the current point. Examples of gradient method are the gradient descent and the conjugate gradient. The minimizing algorithm maybe a function to minimize, a vector of fixed parameters to the function, and a vector of variable parameters to the function are input. The algorithm finds the values of the variable parameters for which the function is minimized.

The resulting argument $(p_1^0, \ldots, p_M^0)$ of the minimal value is the measurement data of the regularized three-ink model.

By construction, the error functional R is not convex, its minimal value is zero and the solution is not unique. The resulting solution $(p_1^0, \ldots, p_M^0)$ obtained by the minimization process has zero value of the error functional R $(p_1^0, \ldots, p_M^0)=0$, which means that it satisfies the regularity condition. Thus by construction $(p_1^0, \ldots, p_M^0)$ is the measurement data of the regularized three-ink model. By nature of the gradient method, this data will be as close as possible to the original measurement data $(p_1, \ldots, p_M)$. In some cases however, the minimization process does not result in a zero value for the error functional in a given amount of processing time. Nevertheless, the error functional is reduced significantly and the minimization process finishes with a small non-zero value for the error functional. The dimension of the space of measurement data is 3M.

Other techniques to minimize the error functional can be used too, but the gradient method in general converges to zero or a minimal value in a minimum number of iterations.

Thus we have obtained a 3M-dimensional non-convex minimization problem. Solution of this problem by gradient method gives the measurement data $(p_1^0, \ldots, p_M^0)$ for the regularized three-ink model. By nature of the gradient method, this data will most likely be as close to the initial measurement data $(p_1, \ldots, p_M)$ as possible.

In this optimization procedure, a number of color values can be retained, i.e. they are not changed during the optimization procedure. Typically this is done for the color of the medium (e.g. the printing paper), and the primary inks.

Regularization of a Four-Ink Model

Consider a piecewise-linear four-ink model F: $W^4 \rightarrow R^3$ of a four-ink color device. The characteristic vector field $\chi$ of the four-ink model under consideration is defined as $\chi|\Delta_j = \chi_j$, where $\chi_j = (\det B_j^1, -\det B_j^2, \det B_j^3, -\det B_j^4)$ for $j=1, \ldots, N$.

At the first step count the number $n_{pos}^i$ of positive i-th coordinates and the number $n_{neg}^i$ of negative i-th coordinates of the characteristic vector field $\chi$ i=1, 2, 3, 4.

Assume that $n_{pos}^i > n_{neg}^i$ for i=1, 2, 3 and $n_{pos}^4 < n_{neg}^4$. This sign signature is represented as (+,+,+,−).

At the second step define a positive threshold $\epsilon$, $\epsilon > 0$, usually a small real number, and construct an error functional R, $R=R(p_1, \ldots, p_M)=\Sigma_{i=1, 2, 3, 4, j=1, \ldots, N} R_j^i(p_1, \ldots, p_M)$. Here $R_j^i = R_j^i(p_1, \ldots, p_M) = 0$ if $(-1)^{i+1} \det B_j^i \geq \epsilon$ and $R_j^i = R_j^i(p_1, \ldots, p_M) = [\epsilon - (-1)^{i+1} \det B_j^i]^2$ if $(-1)^{i+1} \det B_j^i < \epsilon$ for i=1, 2, 3. For i=4 $R_j^4 = R_j^4(p_1, \ldots, p_M) = 0$ if $\det B_j^4 \geq \epsilon$ and $R_j^4 = R_j^4(p_1, \ldots, p_M) = (\epsilon - \det B_j^4)^2$ if $\det B_j^4 < \epsilon$ for $j=1, \ldots, N$. In both cases are the three-dimensional points in color space, forming the measurement data of the four-ink model. By construction of the piecewise-linear map F, all the determinants $\det B_j^i$ are third order polynomials with respect to measurement data $p_1, \ldots, p_M$ for $j=1, \ldots, N$ and i=1, 2, 3, 4. Hence, all the functions $R_j^i$ are smooth for $j=1, \ldots, N$, i=1, 2, 3, 4, and hence the error functional $R=R(p_1, \ldots, p_M)$ is smooth with respect to measurement data $p_1, \ldots, p_M$ too.

For the other case, assume that $n_{pos}^i < n_{neg}^i$ for i=1, 2, 3 and $n_{pos}^4 > n_{neg}^4$. This sign signature is now represented as (−,−,−,+).

Now, at the second step define a positive threshold $\epsilon$, $\epsilon > 0$, usually a small real number, and construct an error functional R, $R=R(p_1, \ldots, p_M)=\Sigma_{1,2, 3, 4, j=1, \ldots, N} R_j^i(p_1, \ldots, p_M)$. Here $R_j^i = R_j^i(p_1, \ldots, p_M) = 0$ if $(-1)^{i+1} \det B_j^i \leq -\epsilon$ and $R_j^i = R_j^i(p_1, \ldots, p_M) = [\epsilon + (-1)^{i+1} \det B_j^i]^2$ if $(-1)^{i+1} \det B_j^i > -\epsilon$ for i=1, 2, 3. For i=4 $R_j^4 = R_j^4(p_1, \ldots, p_M) = 0$ if $-\det B_j^4 \geq \epsilon$ and $R_j^4 = R_j^4(p_1, \ldots, p_M) = (\epsilon + \det B_j^4)^2$ if $-\det B_j^4 < \epsilon$ for $j=1, \ldots, N$.

For CMYK four-ink models the characteristic vector field $\chi$, has the characteristic $n_{pos}^i > n_{neg}^i$ for i=1, 2, 3 and $n_{pos}^4 < n_{neg}^4$. However, for other ink combinations, e.g. OMYK with O orange, M magenta Y yellow and K black, $n_{pos}^i > n_{neg}^i$ for i=2, 3 and $n_{pos}^i < n_{neg}^i$ for i=1, 4. For different sign characteristics of the characteristic vector field the previous second step can be easily adapted by a person skilled in the art who has the disclosures in the present document at his disposal.

At the third step minimize the error functional R with respect to measurement data $p_1, \ldots, p_M$, $R(p_1, \ldots, p_M) \rightarrow$ min by making of an minimum optimizing algorithm and preferably a gradient method. A gradient method in optimizing techniques is an algorithm to solve problems of the form $$\min_{x \in R^n} f(x)$$

with the search directions defined by the gradient of the function at the current point. Examples of gradient method are the gradient descent and the conjugate gradient. The minimizing algorithm maybe a function to minimize, a vector of fixed parameters to the function, and a vector of variable parameters to the function are input. The algorithm finds the values of the variable parameters for which the function is minimized.

The resulting argument $(p_1^0, \ldots, p_M^0)$ of the minimal value is the measurement data for regularized four-ink model, analogously to the regularization of a three-ink model discussed above.

By construction, the error functional R, is not convex, its minimal value is zero and the solution is not unique. The dimension of the space of measurement data is 3M.

Thus we have obtained a 3M-dimensional non-convex minimization problem. Solution of this problem by gradient method gives the measurement data $(p_1^0, \ldots, p_M^0)$ for regularized four-ink model. By nature of the gradient method, this data will most likely be as close to the initial measurement data $(p_1, \ldots, p_M)$ as possible.

In this optimization procedure, a number of color values can be retained, i.e. they are not changed during the optimization procedure. Typically this is done for the color of the medium (e.g. the printing paper), and the primary inks.

In addition it is advantageous to build-in extra conditions such as:

a maximal deltaE per color patch, so that the maximum deltaE is limited during the minimization search.

limitations on the global ink exchange. For a CMYK four-ink model, the exchange between CMY and K is restrained within predefined limits. If K changes with 1 percent, the change for CMY is limited between $I_{min}$ and $I_{max}$ percent for the CMY values. In this way the separations do not change drastically if the GCR is modified smoothly.

The angle between the characteristic vectors of neighboring simplices are limited to obtain smooth paths in colorant space mapping to the same color in color space For some four-ink models however, there is not always a global ink exchange for the entire colorant gamut. In those cases, the colorant gamut can be divided into several parts with each their own global ink exchange. The error functional in this case is the sum of the error functionals of the separate parts, each reflecting its particular global ink exchange. During the optimization procedure this error functional is minimized.

In the previous paragraphs, i.e. the regularization for three- and four-ink models, it is assumed that the vertices of the piecewise-linear n-ink model are given by the measurement data upon which the n-ink model is based. In practice, however, it is advantageous that the mesh defining the piecewise-linear n-ink model is a regular grid in colorant space. In most cases, the mesh defining the piecewise-linear model is not always a subset of the measurement data and hence missing vertices have to be calculated, typically based on neighboring colorant combinations. Both interpolation and extrapolation techniques are used to get color values for the missing vertices. During the regularization, these interpolated or extrapolated colors can either be taken into account by considering the inter- or extrapolation model used (so these colors are not modified independently during the regularization as the interpolation for these colors is explicitly built into the error functional), or these vertices can be seen as independent variables.

Gamut Calculation and Ink Limitations

For a three-ink model, the ink limitations, which are considered to be linear limitations of the colorant domain, redefine the boundary of the colorant cube. The concepts of inner and outher boundary faces can easily be applied to the colorant cube with ink limitations. Specifically, for a regular three-ink model, the gamut boundary is defined by the boundary faces.

Also for a four-ink model, the concepts of boundary and singular faces can be easily extended for a number of additional ink limitations.

Regularization and Ink Limitations for Four-Ink Models

If a four-ink model is regularized, the four-ink model is not necessarily regular if ink limitations have to be taken into account.

If a four-ink model is regular for a given colorant domain, it is also regular for ink limitations for single inks. For example a CMYK four-ink model that is regular for the domain ranging from 0 to 100% for all ink values, then the four-ink model is also regular if the K value is limited to 95%.

However, a four-ink model that is regular for the domain ranging from 0 to 100% for all ink values, is not necessarily regular for any ink limitation.

A TAC (Total Area Coverage) is a linear ink limitation limiting the normal domain of ink values defined as follows:

$$c^1+c^2+c^3+c^4 <= TAC$$

with $(c^1,c^2,c^3,c^4)$ the colorant values of the four-ink model and with TAC the maximum amount of ink, a value between 0 and 400%.

To make a four-ink model regular for any TAC, the following additional criterion is added to the minimization problem:

As discussed before, all colorant combinations that map to the same color constitute a connected path in colorant space that starts and ends at the colorant boundary.

To create a regular four-ink model that is also regular for any TAC, it is imposed that the path of colorant combinations that map to a given color does not start or (exclusive or) does not end in the hyperplane defined by the ink limitation.

Which criterion to choose can be based on checking the four-ink model at hand, i.e. whether for a given ink limitation a path typically starts or ends in the hyperplane defined by the ink limitation.

This condition is expressed as follows:

$$\chi^1_j+\chi^2_j+\chi^3_j+\chi^4_j < -\epsilon \text{ or } \chi^1_j+\chi^2_j+\chi^3_j+\chi^4_j > \epsilon$$

If the first condition is selected, then the error functional R is added with the following term $R^{gil}_j$ per simplex j:

$$\chi^1_j+\chi^2_j+\chi^3_j+\chi^4_j < -\epsilon => R^{tac}_j=0$$

$$\chi^1_j+\chi^2_j+\chi^3_j+\chi^4_j \geq -\epsilon => R^{tac}_j=(\chi^1_j+\chi^2_j+\chi^3_j+\chi^4_j+\epsilon)^2$$

If the second condition is selected, the error functional R is added with the following term $R^{tac}_j$ per simplex j:

$$\chi^1_j+\chi^2_j+\chi^3_j+\chi^4_j \geq \epsilon => R^{tac}_j=0$$

$$\chi^1_j+\chi^2_j+\chi^3_j+\chi^4_j < \epsilon => R^{tac}_j=(\chi^1_j+\chi^2_j+\chi^3_j+\chi^4_j-\epsilon)^2$$

with $\epsilon$ a small strictly positive value

For general ink limitations $a^1c^1+a^2c^2+a^3c^3+a^4c^4 < a^0$, a four-ink model is made regular as follows based on the conditions $$a^1\chi^1_j+a^2\chi^2_j+a^3\chi^3_j+a^4\chi^4_j < -\epsilon \text{ or}$$

$$a^1\chi^1_j+a^2\chi^2_j+a^3\chi^3_j+a^4\chi^4_j > \epsilon$$

with $a^0, a^1, a^2, a^3, a^4$ real values

If the first condition is selected, then the error functional R is added with the following term $R^{gil}_j$ per simplex j:

$$a^1\chi^1_j+a^2\chi^2_j+a^3\chi^3_j+a^4\chi^4_j < -\epsilon => R^{gil}_j=0$$

$$a^1\chi^1_j+a^2\chi^2_j+a^3\chi^3_j+a^4\chi^4_j \geq -\epsilon => R^{gil}_j=(a^1\chi^1_j+a^2\chi^2_j+a^3\chi^3_j+a^4\chi^4_j+\epsilon)^2$$

If the second condition is selected, the error functional R is added with the following term $R^{gil}_j$ per simplex j:

$$a^1\chi^1_j + a^2\chi^2_j + a^3\chi^3_j + a^4\chi^4_j \geq \epsilon = R^{gil}_j = 0$$

$$a^1\chi^1_j + a^2\chi^2_j + a^3\chi^3_j + a^4\chi^4_j < \epsilon = > R^{gil}_j = (a^1\chi^1_j + a^2\chi^2_j + a^3\chi^3_j + a^4\chi^4_j - \epsilon)^2$$

with $\epsilon$ a small strictly positive value

If multiple general ink limitations are defined, an additional term is added to the error functional R per ink limitation, as explained above.

Colorant Limitations

For a number of measurement files, the regularization process results in rather large color changes. Evaluation of some color devices indicates that the color device in reality does not behave regularly, so that regularization is not the proper action to take. As singular n-ink models often result into non-continuous separations for some color variations, it is preferred to reduce the colorant domain so that the n-ink model is regular for the remaining colorant domain.

First of all, it is checked whether an n-ink model can be regularized. This is done by checking the required color changes to make the n-ink model regular. If these changes are unacceptably high for a given application, it can be concluded that the n-ink model cannot be regularized. In that case, simplices resulting in singular printing behavior can be identified and eliminated from the colorant domain of the n-ink model. This is preferably done in such a way that the reduced domain is connected and by preference also convex.

In another approach the most singular simplices, e.g. as defined by the error functional $R^j$ of simplex j, are eliminated, preferably resulting in a connected and by preference also convex colorant domain, however often there are still some simplices that are slightly singular and hence the n-ink model is regularized for the reduced colorant domain.

Another approach might be to eliminate some vertices and reconstructing a piecewise-linear n-ink model based on the remaining vertices, and apply one of the before mentioned regularization approaches. This elimination of vertices amounts to a local coarsening of the model's grid.

Another advantage of the regularization is obtained during closed loop characterization as described in patent application EP 1596576. In this approach, additional simplices are added to the existing piecewise-linear n-ink model making the n-ink model more accurate in some regions of the colorant cube. This can be seen as a local refinement of the model's grid. The additional criterion to be checked to add a new vertex is preferably based on the regularization criteria as discussed in this patent application. If due to adding one or multiple vertices the n-ink model becomes singular in the neighborhood of these vertices, these vertices are preferably not added. Another approach could be to regularize the new n-ink model after adding a number of vertices. Only if a regularized n-ink model can be obtained without changing the colors too much, the vertices will be added.

Regularity of an n-Ink Model

In a number of cases it is advantageous to know if an n-ink model is regular or singular, also referred to as the regularity of the n-ink model and corresponding color device. Referring to the regularization technique discussed above, a first regularity criterion to take is the error functional for a very small value of E (going to zero).

Another approach to check the regularity of an n-ink model is based on the definition of regular n-ink models and gamut characteristics. Here different regularity criteria are obtained for three- and four-ink models.

For a three-ink model the following criteria can be used to check the regularity:

Sign Criterion

Define $p_{min}$ the number of simplices with determinant $B_j < 0$

Define $p_{zer}$ the number of simplices with determinant $B_j = 0$

Define $p_{pos}$ the number of simplices with determinant $B_j > 0$

The three-ink model is regular if ($p_{min}=0$ or $p_{pos}=0$) and ($p_{zer}=0$) and (the boundary faces of the colorant cube do not intersect in color space).

By definition a three-ink model is singular if it is not regular, i.e. the three-ink model is singular if one of the following conditions is fulfilled:

$P_{neg} \neq 0$ and $p_{pos} \neq 0$ $P_{zer} \neq 0$ the boundary faces of the colorant cube intersect in color space.

Gamut Criterion

The three-ink model is singular if one of the following conditions is fulfilled there is at least one singular face the boundary faces of the colorant cube intersect in color space Inversion Criteria The three-ink model is singular if one of the following conditions is fulfilled:

there is at least one color that can be obtained with multiple colorant combinations there is a color at the gamut boundary that can be reached with a colorant combination inside the colorant domain.

For a four-ink model the following criteria can be used to check regularity:

Sign Criterion

The four-ink model is regular if

For all simplices j, the characteristic vector field $\chi j$ has the same sign signature and all components are non-zero.

By definition a four-ink model is singular if it is not regular, i.e. the four-ink model is singular if one of the following conditions is fulfilled there are at least two simplices j and k, of which the characteristic vector fields $\chi j$ and $\chi k$ have a different sign signature there is at least one simplex j of which at least one component of the characteristic vector field $\chi j$ is zero.

Gamut Criterion

The four-ink model is singular if one of the following conditions is fulfilled there is at least one singular face the boundary faces of the colorant cube intersect in color space Inversion Criteria The four-ink model is singular if one of the following conditions is fulfilled there is at least one color that can be obtained with multiple non-connected paths in the colorant domain there is a color at the gamut boundary that can be reached with multiple colorant combinations there is a color at the gamut boundary that can be reached with a colorant combination inside the colorant domain.

These regularity criteria are based on either sign criteria, gamut characteristics or inversion properties of the n-ink model. There are however many more ways to check the regularity of an n-ink model based on the previous discussion about regular n-ink models.

In practice, not all criteria provided in the previously given definitions of a regular three-ink model an four-ink model have to be taken into account for the regularity criteria. As some conditions are extremely rare to occur, it is save to leave them out. Typically, for a conventional 3-ink model, e.g. a color device with CMY or RGB colorants, only the sign of the determinant $B_j$ is evaluated and the regularization is based n this criteria only as it is extremely rare that boundary faces intersect in color space. For the same reason, regularization of a four-ink model is based only on the sign criterion as for conventional CMYK four-ink models the singular faces rarely intersect (F|Σ injection into the color space) if the model is strictly non-degenerate. Hence, regularity criteria in general don't have to be based completely on the previously given definitions of regular processes.

Also the previously discussed regularization approach to create a strictly non-degenerate four-ink model is too severe. A four-ink model for which the gamut is constructed by the singular faces that do not intersect in color space, and for which every in-gamut color all colorant combinations with which this color can be reached constitute a connected path in colorant space starting and ending at the colorant boundary, are other criteria to check if a model is regular. Also regularization can be based on these criteria. In practice, the regularization is based on splitting up the colorant domain in regions with a uniform ink exchange and applying the previously discussed regularization approach per region. Also the connectivity of colorant paths mapping to the same color has to be checked. This can be easily done as per pentahedron the path is constant and hence a finite number of tests are required. For two neighboring regions, every path in the first region that ends at the common boundary of both regions, continues in the second region.

In practice well-behaving separation tables can be constructed based on n-ink models for which the error functional after regularization are reduced significantly but not necessarily zero. Hence it is also acceptable to apply a regularization even if the required values are not reached.

It is also advantageous that during the regularization process it is guaranteed that at least the n-ink model is non-degenerated. This means:
for three-ink process the rank of Bj is three
for four-ink processes the characteristic vector field is never parallel with one of the hyperplanes defining the colorant boundary. Mathematically this can be expressed as the requirement that the scalar product between the characteristic vector field and the normal of the ink limitation is zero. In particular for the limitations per ink it means that the components of the characteristic vector field are always non-zero.

In this way, a three-ink model can always be inverted for any simplex. For a four-ink model, there is always an inversion for the three-ink boundary processes, and per pentahedron there is a one-dimensional path along which all colorant map to the same color (characteristic vector field is non-zero). The error functional imposing one of these conditions can be defined in a similar way as for the regularization of n-ink models. Preferably with gradient optimization techniques, an n-ink model is obtained with the before mentioned local inversion characteristics. But also other minimizing optimization techniques can be used. A gradient method in optimizing techniques is an algorithm to solve problems of the form $$\min_{x \in R^n} f(x)$$

with the search directions defined by the gradient of the function at the current point. Examples of gradient method are the gradient descent and the conjugate gradient. The minimizing algorithm maybe a function to minimize, a vector of fixed parameters to the function, and a vector of variable parameters to the function are input. The algorithm finds the values of the variable parameters for which the function is minimized.

As a result, several regularity checks can be constructed to check the regularity of an n-ink model and a corresponding regularization process can be designed make the model regular.

In this document, a printer characteristic, also called color profile characteristics, for a given n-ink model is a characteristic that indicates the regularity of the n-ink model. A printer characteristic, also called color profile characteristics comprises a set of one or more measures and a corresponding set of one or more values and/or ranges for these measures (i.e. to each measure corresponds a value or a range). The regularity criteria discussed above are typical examples of printer characteristics, also called color profile characteristics. E.g., a printer characteristic, also called color profile characteristic, for a CMY three-ink model is the set of the signs of the determinants of the Jacobian matrices for all simplices; if these signs are all negative, the three-ink model is regular. For a CMYK four-ink model, a typical printer characteristic, also called color profile characteristic, is given by the sign signature, e.g. (+,+,+,−), of the characteristic vector field of the four-ink model. As discussed above, a printer characteristic, also called color profile characteristic, that is selected for the n-ink model is then evaluated, e.g. a piecewise-linear three-ink model for e.g. a three-ink model. If it follows from the evaluation that the three-ink model is regular (e.g. all the signs of the determinants of the Jacobian matrices for all simplices are negative, for the piecewise linear model), then the three-ink model can be used as such. If it follows from the evaluation that the n-ink model is not regular, the n-ink model is modified; e.g. the procedure as explained above under the "Regularization of a three-ink model" is followed, and a modified n-ink model is made, based on the data $(p_1^0, \ldots, p_M^0)$ obtained by solving the minimization problem.

A practical example of a regularity check is given for a three-ink model addressed via a GDI driver. In this case, typically RGB data is sent to the color device, but an internal look-up table is used to convert e.g. the RGB colorant values to CMYK colorant values. To check the color behavior of this color table, an RGB target is printed and measured. Based on this data a piecewise-linear three-ink model is made and one of the regularity checks for three-ink model is applied. If this model is singular, there are some color gradations that can not be reproduced in a continuous way and hence there are some RGB colors that are reproduced with some deltaE. If the three-ink model is singular it also means that this color device can not be color-managed properly. For example, this color device could not be used for color-accurate applications such as contract proofing in graphic arts.

Quality Forward Color Tables, Measurement Files and n-Ink Models

Based on splitting up a given domain in a number of simplices, the number of singular simplices (simplex j with error functional $R_j$ different from zero) and the error functional R can be calculated (see e.g. the regularization of a three-ink model discussed above).

Figure 18:
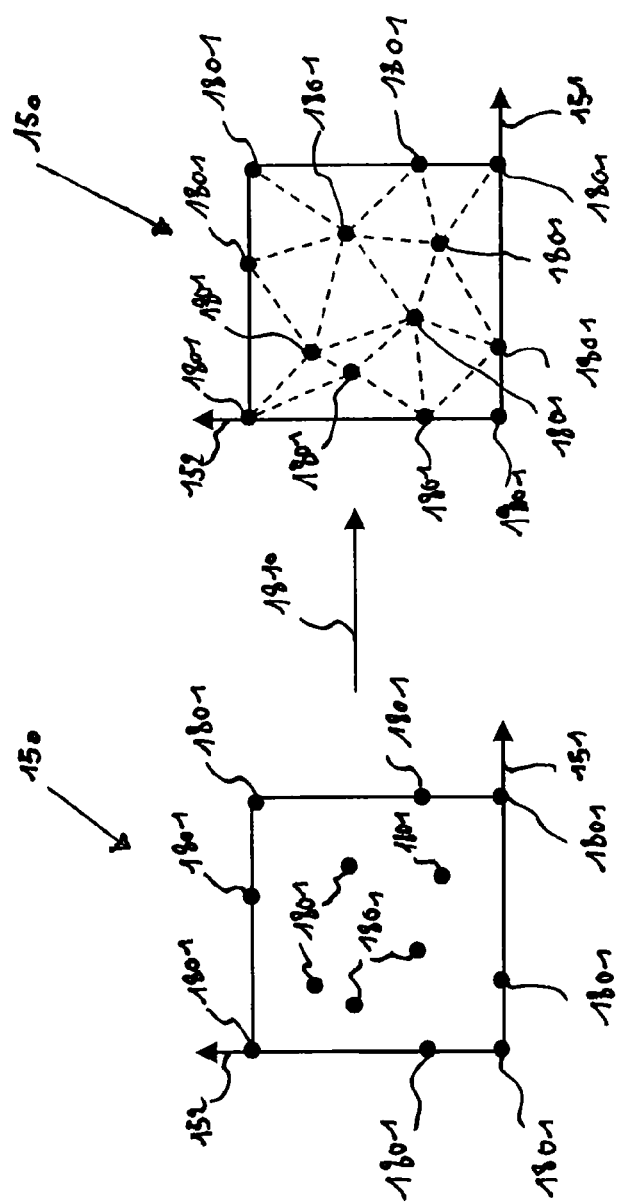
FIG. 18 shows how a two-dimensional colorant space 150 is splitted 1810 into simplices defined by some color combinations 1801.
Figure 19:
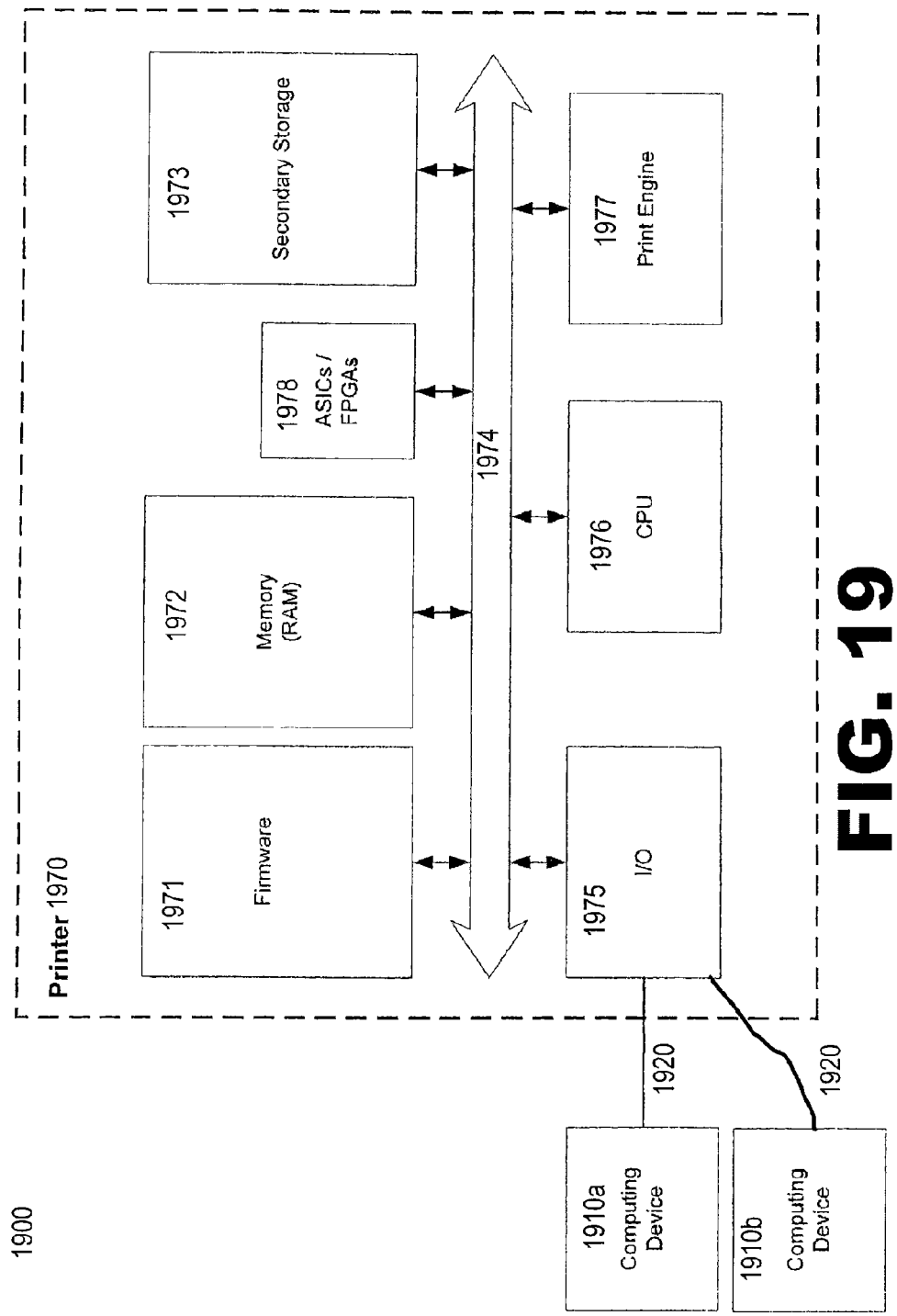
FIG. 19 shows in system 1900 an exemplary printer 1970 that perform color space conversions, color management, color translations and print images from colorant space or color space to the colorant space of the printer 1970

For forward color tables, e.g. as defined in color profiles (as defined by ISO 15076), a regular mesh is defined as hence the colorant domain can be easily split up in simplices as discussed before. In a similar way, this can be done for measurement files, even though no regular mesh is available. And finally for n-ink models, a number of colorant and color combinations can be retrieved resulting in a mesh of "measurement data". Again for this mesh, the colorant domain is split up a number of simplices, upon which a piecewise-linear n-ink model can be constructed. In FIG. 18 a two-dimensional colorant space is split up in a number of simplices based on a set of colorant combinations indicated by the black dots.

The value of the error functional R of a piecewise-linear n-ink model is a measure for the quality of this color table, since R is a measure the distance from regularity. The larger the value of R, the poorer the quality of the table.

Regularization for n-Ink Models with n>4

As separations for n-ink models are based on the separation of a number of four-ink models, the error functional will be the sum of the error functional of the separate four-ink models. For the CMYKOG six-ink model (with C cyan, M magenta, Y yellow, K black, O orange, G green), the four-ink submodels CMYK, OMYK and CGYK are used. Each submodel has a typical global ink exchange, that defines its error functional. The error functional of the n-ink model is the sum of the error functional of the four-ink submodels.

Also in the very general case, the different four-ink submodels can be divided into different parts with each having a particular global ink exchange. The error functional to be minimized is again the sum of the error functionals of the four-ink subprocesses.

Wide-Gamut CMYK Four-Ink Model

For some applications, a wide-gamut CMYK four-ink model is needed in some PDF workflows to encode the color of a number of source objects. These objects can be defined in different color spaces such as Adobe RGB, CMYK, CIELAB and by preference are large enough in gamut to encompass the gamut of most color devices including ink jet devices with additional inks such as orange, green and blue. The most simple way to encode such a wide-gamut CMYK device can be done as follows:

Map (0,0,0,0) to CIELAB (100, 0, 0)
Map (100,100,100,100) to CIELAB (0, 0, 0)
Select the CIELAB values for the primaries Red, yellow, green, cyan, blue and magenta according a wide-gamut RGB color space, e.g. Adobe RGB.

Red: map (0,100,100,0) to Adobe RGB (255,0,0)
Yellow: map (0,0,100,0) to Adobe RGB (255,255,0)
Green: map (100,0,100,0) to Adobe RGB (0,255,0)
Cyan: map (100,0,0,0) to Adobe RGB (0,255,255)
Blue: map (100,100,0,0) to Adobe RGB (0,0,255)
Magenta: map (0,100,0,0) to Adobe RGB (255,0,255)
Map the primaries and secondaries with 100% K as follows Hue $(c_1,c_2,c_3,100)$ same as hue $(c_1,c_2,c_3,0)$
Lightness $(c_1,c_2,c_3,100)$ smaller than lightness $(c_1,c_2,c_3,0)$
Chroma $(c_1,c_2,c_3,100)$ smaller than chroma $(c_1,c_2,c_3,0)$
with $c_1,c_2,c_3$ all possible combinations of 0 and 100 except (0,0,0) and (100,100,100) and such that most before discussed gamuts can be enclosed These 14 colors define the gamut of a CMYK four-ink model with a global ink exchange CMY to K. The remaining two colorant combinations (0,0,0,100) and (100,100,100,0) have to be in-gamut. These colors are mapped as follows:

(0,0,0,100) is a neutral color
(100,100,100,0) is a neutral color
The lightness values for both colors are not that important.

To obtain a regular CMYK four-ink model, the four-ink model is regularized. In this way an artificial wide-gamut CMYK space is constructed based on the 16 Neugebauer primaries, with a well-defined gamut and inversion properties such that smooth and continuous separations are obtained for any color gradation in color space.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method for printing an image with a printer that uses three inks defining a three-dimensional ink-space and for which is available a set of three-dimensional color measurements $\{p_i\}(i=1, \ldots, M)$ of color patches with three-ink combinations in the three-dimensional ink-space of the printer, the method comprising the steps of:

decomposing at least a portion of the three dimensional ink-space into a union of tetrahedrons $\Delta_j(j=1, \ldots, N)$ of which vertices correspond with the three-ink combinations of the color patches;

determining a first piece-wise linear three-ink printer model by calculating for each tetrahedron a linear transformation $A_j+B_j*C(j=1, \ldots, N)$, wherein $A_j$ is a 3×1 column matrix, $B_j$ is a 3×3 matrix, and C is a 3×1 column matrix representing a three-ink combination, the linear transformation mapping the three-ink combination in such a tetrahedron onto a color in a three-dimensional color space;

determining for each tetrahedron $\Delta_j(j=1, \ldots, N)$ a value of a determinant of the matrix $B_j$;

counting a number $n_{neg}$ of negative determinants and a number $n_{pos}$ of positive determinants;

if $n_{pos}>n_{neg}$:

selecting a positive real threshold value $\epsilon$ that provides a minimum value for the determinants;

defining an error functional R having a set of M colors as arguments, the error functional being a sum of measured distances between the real threshold value $\epsilon$ and the determinants according to the following rule:

$R=R(p_1, \ldots, p_m)=\Sigma_{j=1, \ldots, N} R_j(p_1, \ldots, p_m);$
wherein $R_j=R_j(p_1, \ldots, p_M)=0$ if det $B_j\geq\epsilon$; and $R_j=R_j(p_1, \ldots, p_M)=(\epsilon-\det B_j^i)^2$ if det $B_j^i<\epsilon$ if $n_{pos}<n_{neg}$:

selecting a negative real threshold value $\epsilon$ that provides a maximum value for the determinants;

defining an error functional R having a set of M colors as arguments, the error functional being a sum of measured distances between the real threshold $\epsilon$ and the determinants according to the following rule:

$R=R(p_1, \ldots, p_m)=\Sigma_{j=1, \ldots, N} R_j(p_1, \ldots, p_m);$
wherein $R_j=R_j(p_1, \ldots, p_M)=0$ if det $B_j\geq\epsilon$; and $R_j=R_j(p_1, \ldots, p_M)=(\epsilon-\det B_j^i)^2$ if det $B_j^i<\epsilon$ searching for a set of colors $\{p_i^o\}(i=1, \ldots ; M)$ that minimizes the error functional;

using the set of colors $\{p_i^o\}$ to replace the set of color measurements $\{p_i\}$;

obtaining a second piece-wise linear three-ink printer model from a second set of color measurements that is regular by calculating for each tetrahedron a linear transformation $F|\Delta_j(c)=A_j^o+B_j^o \times C$, wherein $A_j^o$ is a 3×1 column matrix, $B_j^o$ is a 3×3 matrix, and C is a 3×1 column matrix representing a three-ink combination, the linear transformation mapping a three-ink combination in such a tetrahedron onto a color in the three-dimensional color space;

using the second piece-wise linear three-ink printer model to create separation tables to convert colors in an image into sets of three inks;

using the separation tables to separate an image that is to be printed into a set of separations; and using the set of separations to print the image.

2. A method for printing an image with a printer that uses four inks defining a four-dimensional ink-space and for which is available a set of three-dimensional color measurements $\{p_i\}(i=1, \ldots, M)$ of color patches with four-ink combinations ($C^k$, k=1, 2, 3, 4) in the four dimensional ink-space, wherein for a given color the ink $C^4$ can be exchanged for a combination of inks $C^1$, $C^2$, $C^3$, the method comprising the steps of:

decomposing at least a portion of the four dimensional ink-space into a union of pentahedrons $\Delta_j(j=1, \ldots, N)$ of which vertices correspond with the four-ink combinations of the color patches;

determining a first piece-wise linear four-ink printer model by calculating for each pentahedron a linear transformation $A_j+B_j*C(j=1, \ldots, N)$, wherein $A_j$ is a 3×1 column matrix, $B_j$ is a 3×4 matrix, and C is a 4×1 column matrix representing a four-ink combination, the linear transformation mapping a four-ink combination in such a pentahedron onto a color in a three-dimensional color space;

determining for each pentahedron $\Delta_j(j=1, \ldots, N)$ a characteristic vector $\chi_j$ that represents a direction in the pentahedron along which all four-ink combinations map onto the same color in color space, the characteristic vector $\chi_j$ having coordinates $[\chi_j^1, \chi_j^2, \chi_j^3, \chi_j^4]=[\det B_j^1, -\det B_j^2, \det B_j^3, -\det B_j^4](j=1, \ldots, N)$, wherein $B_{jk}(k=1, 2, 3, 4)$ are 3×3 matrices obtained by omitting the $k^{th}$ out of the four columns in the 3×4 matrix $B_j$;

counting a number $n^k_{neg}$ of negative coordinates of the characteristic vector coordinates and a number $n^k_{pos}$ of positive coordinates of the characteristic vectors;

if $n^k_{pos}>n^k_{neg}$ for k=1, 2, 3 and if $n^4_{pos}<n^4_{neg}$:

selecting a positive real threshold value $\epsilon$;

defining an error functional R having a set of N colors as arguments, the error functional being a sum of measured distances between the real threshold value $\epsilon$ and the coordinates according to the following rule:

$$R=R(p_1, \ldots, p_M)=\Sigma_{k=1, 2, 3, 4, j=1, \ldots, N}R_j^k(p_1, \ldots, p_M);$$

wherein for k=1, 2, 3:
$R_j^k=R_j^k(p_1, \ldots, p_M)=0$ if $\chi_j^k\geq\epsilon$; and
$R_j^k=R_j^k(p_1, \ldots, p_M)=(\epsilon-\chi_j^k)^2$ if $\chi_j^k<\epsilon$;

wherein for k=4:
$R_j^4=R_j^4(p_1, \ldots, p_M)=0$ if $\chi_j^4\leq-\epsilon$; and
$R_j^4=R_j^4(p_1, \ldots, p_M)=(\epsilon-\chi_j^4)^2$ if $\chi_j^4>-\epsilon(j=1, \ldots, N)$;

if $n^k_{pos}<n^k_{neg}$ for i=1, 2, 3 and if $n^4_{pos}>n^4_{neg}$:

selecting a negative real threshold value $\epsilon$;

defining an error functional R having a set of N colors as arguments, the error functional being a sum of measured distances between the real threshold $\epsilon$ and the coordinates according to the following rule:

$$R=R(p_1, \ldots, p_M)=\Sigma_{k=1, 2, 3, 4, j=1, \ldots, N}R_j^k(p_1, \ldots, p_M);$$

wherein for k=1, 2, 3:
$R_j^k=R_j^k(p_1, \ldots, p_M)=0$ if $\chi_j^k\leq\epsilon$; and
$R_j^k=R_j^k(p_1, \ldots, p_M)=(\epsilon+\chi_j^k)^2$ if $\chi_j^k>\epsilon$;

wherein for k=4:
$R_j^4=R_j^4(p_1, \ldots, p_M)=0$ if $\chi_j^4\geq-\epsilon$; and
$R_j^4=R_j^4(p_1, \ldots, p_M)=(\epsilon+\chi_j^4)<-\epsilon$ for j=1, \ldots, N;

searching for a set of colors $\{p_i^o\}$ that minimizes the error functional;

using the set of colors $\{p_i^o\}$ to replace the set of color measurements $\{p_i\}$;

obtaining a second piece-wise linear four-ink printer model by calculating for each pentahedron a linear transformation $F|\Delta_j(c)=A_j^o+B_j^o\times C$, wherein $A_j^o$ is a 3×1 column matrix, $B_j^o$ is a 3×4 matrix, and C is a 4×1 column matrix representing a four-ink combination, the linear transformation mapping a four-ink combination in such a pentahedron onto a color in the three-dimensional color space;

using the second piece-wise linear four-ink printer model to create separation tables to convert colors in an image into sets of four inks;

using the separation tables to separate an image that is to be printed into a set of separations;

using the set of separations to print the image.

3. A method for printing an image with a printer that uses four inks defining a four-dimensional ink-space for which is available a set of three-dimensional color measurements $\{p_i\}(i=1, \ldots, M)$ of color patches with four-ink combinations ($C^k$, k=1, 2, 3, 4) in the four dimensional ink-space, wherein for a given color the inks $C^4$ and $C^4$ can be exchanged for a combination of inks $C^1$ and $C^4$, the method comprising the steps of:

decomposing at least a portion of the four dimensional ink-space into a union of pentahedrons $\Delta_j(j=1, \ldots, N)$ of which vertices correspond with the four-ink combinations of the color patches;

determining a first piece-wise linear four-ink printer model by calculating for each pentahedron a linear transformation $A_j+B_j*C(j=1, \ldots, N)$, wherein $A_j$ is a 3×1 column matrix, $B_j$ is a 3×4 matrix, and C is a 4×1 column matrix representing a four-ink combination, the linear transformation mapping a four-ink combination in such a pentahedron onto a color in a three-dimensional color space;

determining for each pentahedron $\Delta_j(j=1, \ldots, N)$ a characteristic vector $\chi_j$ that represents a direction in the pentahedron along which all four-ink combinations map onto the same color in color space, the characteristic vector $\chi_j$ having coordinates $[\chi_j^1, \chi_j^2, \chi_j^3, \chi_j^4]=[\det B_j^1, -\det B_j^2, \det B_j^3, -\det B_j^4](j=1, \ldots, N)$, wherein $B_{jk}(k=1, 2, 3, 4)$ are 3×3 matrices obtained by omitting the $k^{th}$ out of the four columns in the 3×4 matrix $B_j$;

counting a number $n^k_{neg}$ of negative coordinates of the characteristic vector coordinates and a number $n^k_{pos}$ of positive coordinates of the characteristic vectors;

if $n^k_{pos} > n^k_{neg}$ for k=2, 3 and if $n^k_{pos} < n^k_{neg}$ for k=1, 4:

selecting a positive real threshold value $\epsilon$;

defining an error functional R having a set of N colors as arguments, the error functional being a sum of measured distances between the real threshold value $\epsilon$ and the coordinates according to the following rule:

$$R=R(p_1,\ldots,p_M)=\Sigma_{k=1,2,3,4,j=1,\ldots,N} R_j^k(p_1,\ldots,p_M);$$

wherein for k=2, 3:

$R_j^k = R_j^k(p_1,\ldots,p_M) = 0$ if $\chi_j^k \geq \epsilon$; and $R_j^k = R_j^k(p_1,\ldots,p_M) = (\epsilon - \chi_j^k)^2$ if $\chi_j^k < \epsilon$;

wherein for k=1, 4:

$R_j^4 = R_j^k(p_1,\ldots,p_M) = 0$ if $\chi_j^k \leq -\epsilon$; and $R_j^4 = R_j^k(p_1,\ldots,p_M) = (\epsilon - \chi_j^k)^2$ if $\chi_j^k > \epsilon$ (j=1,\ldots,N);

if $n^k_{pos} < n^k_{neg}$ for i=2, 3 and if $n^k_{pos} > n^k_{neg}$ for k=1, 4:

selecting a negative real threshold value $\epsilon$;

defining an error functional R having a set of N colors as arguments, the error functional being a sum of measured distances between the real threshold $\epsilon$ and the coordinates according to the following rule:

$$R=R(p_1,\ldots,p_M)=\Sigma_{k=1,2,3,4,j=1,\ldots,N} R_j^k(p_1,\ldots,p_M);$$

wherein for k=2, 3:

$R_j^k = R_j^k(p_1,\ldots,p_M) = 0$ if $\chi_j^k \leq \epsilon$; and $R_j^k = R_j^k(p_1,\ldots,p_M) = (\epsilon + \chi_j^k)^2$ if $\chi_j^k > \epsilon$;

wherein for k=1, 4:

$R_j^4 = R_j^4(p_1,\ldots,p_M) = 0$ if $\chi_j^4 \geq \epsilon$; and $R_j^4 = R_j^4(p_1,\ldots,p_M) = (\epsilon + \chi_j^4)^2$ if $\chi_j^4 < -\epsilon$ for j=1,\ldots,N;

searching for a set of colors $\{p_i^o\}$ that minimizes the error functional;

using the set of colors $\{p_i^o\}$ to replace the set of color measurements $\{p_i\}$;

obtaining a second piece-wise linear four-ink printer model by calculating for each pentahedron a linear transformation $F|\Delta_j(c) = A_j^o + B_j^o \times C$, wherein $A_j^o$ is a 3×1 column matrix, $B_j^o$ is a 3×4 matrix, and C is a 4×1 column matrix representing a four-ink combination, the linear transformation mapping a four-ink combination in such a pentahedron onto a color in the three-dimensional color space;

using the second piece-wise linear four-ink printer model to create separation tables to convert colors in an image into sets of four inks;

using the separation tables to separate an image that is to be printed into a set of separations; and using the set of separations to print the image.

4. The method according to claim 1, wherein the printer uses a CMY or an RGB three-ink process.

5. The method according to claim 2, wherein the printer uses a CMYK four-ink process.

6. The method according to claim 3, wherein the printer uses a OMYK process or a GCYK process.

7. A method for printing an image with a printer that uses n inks defining a n-dimensional ink-space and for which is available a first set of three-dimensional color measurements $\{p_i\}(i=1,\ldots,M)$ of color patches with n-ink combinations ($C^k$, k=1,\ldots n) in an the n-dimensional ink-space, the method comprising the steps of:

obtaining a plurality of piece-wise four-ink models, each piece-wise-linear four-ink model of the plurality of piece-wise-linear four-ink models is a subset of four of the n-inks, each of the four-ink printer model having a global ink exchange that defines its error functional;

minimizing an error functional that is a sum of the error functionals of the four-ink printer model using a method according to claim 2 depending on the global ink exchange to obtain a second set of three-dimensional color measurements $\{p^o_i\}(i=1,\ldots,M)$;

using the second set of three-dimensional color measurements $\{p^o_i\}(i=1,\ldots,M)$ to create separation tables to convert colors in an image into sets of n inks;

using the separation tables to separate an image that is to be printed into a set of separations; and using the set of separations to print the image.

8. A method for printing an image with a printer that uses three inks defining a three-dimensional ink-space and for which is available a first set of three-dimensional color measurements $\{p_i\}(i=1,\ldots,M)$ of color patches with n-ink combinations ($C^k$, k=1,\ldots n) in the n-dimensional ink-space, the method comprising the steps of:

obtaining a plurality of piece-wise four-ink models, each piece-wise-linear four-ink model of the plurality of piece-wise-linear four-ink models is a subset of four of the n-inks, each of the four-ink printer model having a global ink exchange that defines its error functional;

minimizing an error functional that is a sum of the error functionals of the four-ink printer model using a method according to claim 3 depending on the global ink exchange to obtain a second set of three-dimensional color measurements $\{p^o_i\}(i=1,\ldots,M)$;

using the second piece-wise linear three-ink printer model to create separation tables to convert colors in an image into sets of three inks;

using the separation tables to separate an image that is to be printed into a set of separations; and using the set of separations to print the image with a printer that uses three inks and for which is available.

\* \* \* \* \*